(12) United States Patent
Liem et al.

(10) Patent No.: US 11,606,211 B2
(45) Date of Patent: Mar. 14, 2023

(54) SECURED SYSTEM OPERATION

(71) Applicant: IRDETO B.V., Hoofddorp (NL)

(72) Inventors: Clifford Liem, Ottawa (CA); John O'Connor, Ottawa (CA)

(73) Assignee: Irdeto B.V., Hoofddorp (NL)

( * ) Notice: Subject to any disclaimer, the term of this patent is extended or adjusted under 35 U.S.C. 154(b) by 705 days.

(21) Appl. No.: 16/489,389

(22) PCT Filed: Mar. 8, 2018

(86) PCT No.: PCT/EP2018/055730
§ 371 (c)(1),
(2) Date: Jan. 2, 2020

(87) PCT Pub. No.: WO2018/162628
PCT Pub. Date: Sep. 13, 2018

(65) Prior Publication Data
US 2020/0007342 A1    Jan. 2, 2020

(30) Foreign Application Priority Data

Mar. 10, 2017 (GB) ........................... 1703864

(51) Int. Cl.
*H04L 9/32* (2006.01)
*G06F 16/23* (2019.01)
(Continued)

(52) U.S. Cl.
CPC ........ *H04L 9/3239* (2013.01); *G06F 16/2365* (2019.01); *G07C 5/008* (2013.01);
(Continued)

(58) Field of Classification Search
CPC ................. H04L 9/3239; H04L 9/0637; H04L 9/0643; H04L 2209/38; H04L 2209/84; G06F 16/2365; G06F 21/57; G07C 5/008
See application file for complete search history.

(56) References Cited

U.S. PATENT DOCUMENTS 6,594,761 B1    7/2003  Chow et al.
6,779,114 B1    8/2004  Chow et al.
(Continued)

FOREIGN PATENT DOCUMENTS

CN    101681366 A    3/2010
WO    2009140774 A1  11/2009
(Continued)

OTHER PUBLICATIONS

Fromknecht et al., "CertCoin: A NameCoin Based Decentralized Authentication System 6.857 Class Project", May 14, 2014, pp. 1-19 (Year: 2014).*
(Continued)

*Primary Examiner* — Taghi T Arani
*Assistant Examiner* — Blake I Narramore
(74) *Attorney, Agent, or Firm* — Rimon PC; Marc Kaufman

(57) ABSTRACT

A method of operating a system, wherein the system comprises a plurality of components, the method comprising: maintaining a distributed ledger, wherein the distributed ledger comprises data records, wherein each data record stores information concerning one or more respective components of the plurality of components; at least one component of the plurality of components processing the information stored in one or more respective data records of the distributed ledger to determine whether the system meets one or more respective security criteria; and one or both of: (i) the at least one component performing a respective first action if the at least one component determines that the system meets the one or more respective security criteria; and (ii) the at least one component performing a respective second action if the at least one component determines that the system does not meet the one or more respective security criteria.

20 Claims, 13 Drawing Sheets

(51) Int. Cl.
G07C 5/00 (2006.01)
H04L 9/06 (2006.01)
H04L 9/00 (2022.01)

(52) U.S. Cl.
CPC .......... *H04L 9/0637* (2013.01); *H04L 9/0643* (2013.01); *H04L 9/50* (2022.05); *H04L 2209/84* (2013.01)

(56) References Cited

U.S. PATENT DOCUMENTS

| | | | |
|---|---|---|---|
| 6,842,862 B2 | 1/2005 | Chow et al. | |
| 7,350,085 B2 | 3/2008 | Johnson et al. | |
| 7,395,433 B2 | 7/2008 | Chow et al. | |
| 7,397,916 B2 | 7/2008 | Johnson et al. | |
| 10,521,780 B1* | 12/2019 | Hopkins, III | G06Q 20/10 |
| 2016/0253664 A1* | 9/2016 | Yuan | G06Q 20/24 705/71 |
| 2016/0259937 A1* | 9/2016 | Ford | G06F 21/57 |
| 2016/0299918 A1 | 10/2016 | Ford | |
| 2017/0011460 A1* | 1/2017 | Molinari | G06Q 40/06 |
| 2017/0046669 A1* | 2/2017 | Chow | G06Q 10/0631 |
| 2017/0228734 A1* | 8/2017 | Kurian | H04L 9/3239 |
| 2017/0230353 A1* | 8/2017 | Kurian | G06Q 20/405 |
| 2017/0295157 A1* | 10/2017 | Chavez | G06F 21/6218 |
| 2017/0346833 A1* | 11/2017 | Zhang | H04L 9/3247 |
| 2018/0012433 A1* | 1/2018 | Ricci | G06Q 20/108 |
| 2018/0018723 A1* | 1/2018 | Nagla | H04L 9/3236 |

FOREIGN PATENT DOCUMENTS

| | | |
|---|---|---|
| WO | 2011120123 A1 | 10/2011 |
| WO | 2012126077 A1 | 9/2012 |
| WO | 2013142979 A1 | 10/2013 |
| WO | 2013142980 A1 | 10/2013 |
| WO | 2013142981 A1 | 10/2013 |
| WO | 2013142983 A1 | 10/2013 |
| WO | 2015149828 A1 | 10/2015 |
| WO | 2015150376 A1 | 10/2015 |
| WO | 2015150391 A9 | 11/2016 |
| WO | 2018108275 A1 | 6/2018 |

OTHER PUBLICATIONS

Fromknecht, Conner, et al., "CertCoin: A NameCoin Based Decentralized Authentication System 6.857 Class Project," Mar. 14, 2014, XP55404517; available at: http://courses.csail.mit.edu/6.857/2014/files/19-fromknecht-velicann-yakoubov-certcoin.pdf pp. 1-13.
Pradip Kumar Sharma, et al., "Block-VN: A Distributed Blockchain Based Vehicular Network Architecture in Smart City," Journal of Information Processing Systems, vol. 13 Issue 1, Feb. 1, 2017, pp. 184-195.
Greg Bohl, et al., "Private Blockchains in Automotive Safety," Jan. 18, 2017, XP55406247, retrieved from internet: http://variableauto.com/wp-content/uploads/2017/01/Private-BlockChain-in-automotive-safety.pdf Retrieved Sep. 13, 2017. pp. 1-12.
Xiwei Xu, et al., "The Blockchain as a Software Connector," May 25, 2016, XP55275506; available at: http://design.inf.usi.ch/sites/default/files/biblio/2016_WICSA_BlockChainSoftwareConnector.pdf pp. 1-10.
Liem, C., et al., "A Compiler-Based Infrastructure for Software-Protection," PLAS '08 Proceedings of the third ACM SIGPLAN workshop on Programming languages and analysis for security, pp. 33-44, Tucson, AZ, Jun. 7, 2008.
Chow, S., et al., "A white-box DES implementation for DRM applications," Lecture Notes in Computer Science 2696, Nov. 1, 2002, pp. 1-15.
Department of Commerce, et al., "Specification for the Advanced Encryption Standard (AES)," Federal Information Processing Standards Publication 197, Nov. 26, 2001, pp. 1-51.
Wiener, Michael J., "Applying Software Protection to White-Box Cryptography," Invited Talk Abstract, PPREW-5, Dec. 8, 2015, Los Angeles, CA, ACM 978-1-4503-3642-0/15/12. http://dx.doi.org/10.1145/2843859.2846054.
Billet, O., et al, "Cryptanalysis of a White Box AES Implementation," Selected Areas in Cryptography. SAC 2004. Lecture Notes in Computer Science, vol. 3357. Springer, Berlin, Heidelberg, Aug. 9, 2004, pp. 227-240.
Fromknecht, C., et al., "CertCoin: A NameCoin Based Decentralized Authentication System," 6.857 Class Project, Mar. 14, 2014, XP55404517, Retrieved from the Internet: URL:https://courses.csail.mit.edu/6.857/20 14/files/19-fromknecht-velicann-yakoubov-certcoin.pdf.
Bohl, G., et al., "Priva te Blockchains in Automotive Safety", Jan. 18, 2017, XP55406247, Chapter 5. "Private Blockchains in Automotive," pp. 7-11, Retrieved from the Internet: URL:http://variableauto.com/wp-content/upl oads/2017/01/Private-BlockChain-in-automotive-Safety.pdf.
Xu, X., et al., "The Blockchain as a Software Connector," May 25, 2016, XP55275506, DOI: 10.1109/WICSA.2016.21 Retrieved from the Internet: URL:http://design.inf.usi.ch/sites/default/files/biblio/2016 WICSA BlockChainSoftwar eConnector.pdf, Chapter III. 11 The Blockchain Connector 11 ; p. 2, left-hand column—p. 5, right-hand column.
Sharma et al "Block-VN: A Distributed Blockchain Based Vehicular Network Architecture in Smart City," Journal of Information Processing Systems, vol. 13, No. 1, Feb. 1, 2017 (Feb. 1, 2017), pp. 184-195, XP55471248, DOI: 10.3745/JIPS.03.0065.
Bos, J., et al., "Differential Computation Analysis: Hiding your White-Box Designs is Not Enough," Cryptographic Hardware and Embedded Systems—CHES 2016: 18th International Conference, Santa Barbara, CA, USA, Aug. 17, 2016, Proceedings (pp. 215-236).
Kocher, P., et al., "Differential Power Analysis," Published in: Proceeding CRYPTO '99 Proceedings of the 19th Annual International Cryptology Conference on Advances in Cryptology, pp. 388-39, Aug. 15, 1999.
Dr Mark Peplow, editor, "Distributed Ledger Technology: beyond block chain, A report by the UK Government Chief Scientific Adviser," Jan. 1, 2016, UK Government Office for Science.
Armknecht, F, et al., "A Guide to Fully Homomorphic Encryption," IACR Cryptology ePrint Archive Jan. 1, 2015, 1192, pp. 1-35.
Dionyziz, et al., "Script—Bitcoin Wiki," last revised Mar. 4, 2017, pp. 1-12. https://en.bitcoin.it/w/index.php?title=Script&oldid=62366.
CN First Office Action dated Nov. 25, 2021.
Fromknecht, "CertCoin: A NameCoin based decentralized authentication system 6.857 class project." Mar. 14, 2014; https://courses.csail.mit.edu/6. 857/2014/files/19-fromknecht-ve licann-yakoubov-certcoin.pdf.
Bohl, et al., "Private Blockchains in Automotive Safety." Jan. 18, 2017; pp. 1-12; http://variableauto.com/wp-content/uploads/2017/01/Private-B lockChain-in-automotive-Safety. pdf.
Wikipedia, "Blockchain," Mar. 6, 2017, https://en.wikipedia.org/w/index.php?title=Blockchain&oldid=768969408.
Wikipedia, "Can bus," Feb. 21, 2017, https://en.wikipedia.org/w/index.php?title=CAN_bus&oldid=766622681.
S. Chow, et al.: "White-Box Cryptography and an AES Implementation," Proc. 9th Annual Workshop on Selected Areas in Cryptography (SAC 2002), Aug. 15, 2002, LNCS 2595, pp. 250-270.
S. Chow, et al.: "A White-Box DES Implementation for DRM Applications," Proc. 2nd ACM Workshop on Digital Rights Management (DRM2002), Oct. 15, 2002, LNCS 2696, pp. 1-15.
Wikipedia, "Consensus (computer science)," Mar. 3, 2017; https://en.wikipedia.org/wiki/Consensus_(computer_science).
Wikipedia, "Distributed ledger," Jan. 7, 2017; https://en.wikipedia.org/w/index.php?title=Distributed_ledger&oldid=758826587.
Y. Gu, et al.: "White-Box Cryptography: Practical Protection on Hostile Hosts," Proc. 6th Software Security, Protection and Reverse Engineering Workshop (SSPREW-7), Dec. 5, 2016, DOI=http://doi.acm.org/10.1145/3015135.3015139.
Wikipedia, File verification, Jan. 4, 2017, https://en.wikipedia.org/w/index.php?title=File_verification&oldid=758340746.

(56) References Cited

OTHER PUBLICATIONS

Wikipedia, FIPS 140-2, Mar. 31, 2017, https://en.wikipedia.org/w/index.php?title=FIPS_140-2&oldid=773105180.
Wikipedia, FlexRay, Mar. 8, 2017; https://en.wikipedia.org/w/index.php?title=FlexRay&oldid=769287158.
Wikipedia, Hyperledger, Feb. 21, 2017; https://en.wikipedia.org/w/index.php?title=Hyperledger&oldid=766696837.
Wikipedia, Local Interconnect Network, Feb. 27, 2017; https://en.wikipedia.org/w/index.php?title=Local_Interconnect_Network&oldid=7676.
Wikipedia, Merkle tree, Mar. 9, 2017; https://en.wikipedia.org/w/index.php?title=Merkle_tree&oldid=769440141.
Wikipedia, Paxos (computer science), Feb. 7, 2017; https://en.wikipedia.org/w/index.php?title=Paxos_(computer_science)&oldid=764100.
Wikipedia, Raft (computer science), Jan. 21, 2017; https://en.wikipedia.org/w/index.php?title=Raft_(computer_science)&oldid=761165396.
Wikipedia, Differential fault analysis, May 6, 2016; https://en.wikipedia.org/wiki/Differential_fault_analysis.
Dickson, B, "How blockchain can change the future of IoT." VentureBeat • Nov. 20, 2016, pp. 1-6.
CoreOS, "Using etcd with CoreOS," Oct. 12, 2017, pp. 1-3; https://web.archive.org/web/20170109235911/https://coreos.com/etcd/.
Protocol Labs, "IPFS is the Distributed Web," Jan. 6, 2017, pp. 1-5; https://web.archive.org/web/20170305140700/https://ipfs.io/.
Reichert, C., "Telstra explores blockchain, biometrics to secure smart home IoT devices," Sep. 22, 2016, ZDNet, https_www.zdnet.com_article_telstra-explores-blockchain-biome.
Ronen, E., et al., "IoT Goes Nuclear: Creating a ZigBee Chain Reaction," 2017 IEEE Symposium on Security and Privacy (SP), San Jose, CA, Mar. 22, 2017, DOI: 10.1109/SP.2017.14, pp. 1-18.
European Patent Office, International Search Report and Written Opinion for PCT Application No. PCT/EP2018/055730 dated May 8, 2018.
Newman, L. H., "Say Hello to the Super-Stealthy Malware That's Going Mainstream." Wired, Feb. 9, 2017, https://www.wired.com/2017/02/say-hello-super-stealthy-malware-thats-going-mainstream/.
European Patent Office, Communication Pursuant to Article 94(3) EPC for European Application No. 18709580.7 dated Dec. 1, 2021.
Narayanan, A., et al., "Bitcoin and Cryptocurrency Technologies," Feb. 9, 2016, pp. 3-305, published by Princeton University Press.
European Patent Office, Communication Pursuant to Article 94(3) EPC for European Application No. 18709580.7 dated Oct. 9, 2020.
Canadian examination report dated Jun. 30, 2022.
CN 2nd Office Action dated May 25, 2022.

\* cited by examiner

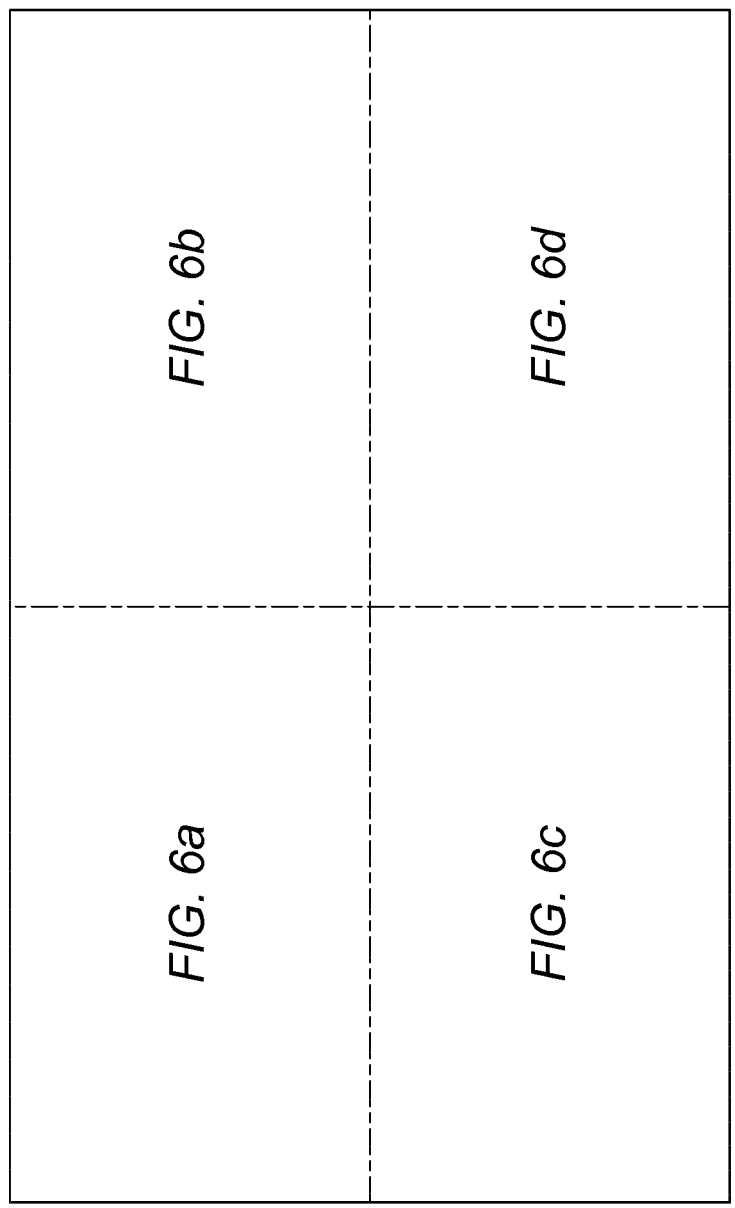

SECURED SYSTEM OPERATION

RELATED APPLICATIONS

This application is a national stage application of PCT/EP2018/055730, filed Mar. 8, 2018, which claims the benefit of priority from Great Britain Application No. 1703864.7, filed Mar. 10, 2017, the disclosures of which are incorporated herein by reference in their entirety.

FIELD OF THE INVENTION

A method of operating a system, a method of operating a component of a plurality of components of a system, and such systems, components thereof and computer programs therefor.

BACKGROUND OF THE INVENTION

The automotive industry is rapidly developing, with advances in many areas, such as: vehicles (such as automobiles, cars, trucks, buses, train, boats, aircraft, satellites, etc.) having more and more computing units (processors); developments in connected infotainment; pairing of on-board equipment to mobile devices (such as telephones, tablets, etc.); cloud connectivity; vehicle-to-vehicle (V2V) technologies that allow vehicles to communicate with other vehicles; vehicle-to-everything (V2X) technologies that allow vehicles to communicate with entities outside of the vehicle; autonomous functions (such as self-driving cars); etc. Connected computing units are becoming an essential part of the modern-day vehicle. Software-driven functions have become the go-to choice for the best-in-class vehicle features. More and more, in-vehicle the systems are becoming a hierarchy of self-similar computing devices which communicate with one another. High data requirements mean that connections are moving from low bandwidth specifications like CAN (controller area network—see https://en.wikipedia.org/wiki/CAN_bus, the entire disclosure of which is incorporated herein by reference) and LIN (local interconnect network—see https://en.wikipedia.org/wiki/Local_interconnect_Network, the entire disclosure of which is incorporated herein by reference) to higher bandwidth designs like FlexRay (see https://en.wikipedia.org/wiki/FlexRay, the entire disclosure of which is incorporated herein by reference) and in-vehicle Ethernet. In-Vehicle Infotainment (IVI) units and connected mobile phones and tablets are making for more computing units in the system. The progression to autonomous vehicles means that a vast array of computing units is constantly trading pieces of data at a high rate, from sensors and engine control units (ECUs) to central processing units (CPUs) and analysis units to IVIs, personal devices, as well as to other vehicles, highway infrastructure and to the cloud.

Any of the above-mentioned computing units is a potential attack point for a malicious attacker. Consider, for example, a rooted Android phone with a piece of malware connecting to the system, or a compromised downloaded app on the IVI, or a USB stick containing a self-propagating piece of malware. V2V connections, V2X connections and connections to the cloud increase the possibility of the origins of malicious intrusions. Malware has gotten better at becoming stealthier, and with the big targets of automobiles, commercial vehicles, and fleets, attackers will become increasingly adept and clever at direct compromises and inserting malware into vehicle systems.

Moreover, as systems become more and more distributed, trust in software components and trust in communicating data is harder and harder to come by, as any single component or piece of data may be compromised. Processors, software, and/or data can be attacked in any part of a distributed system. Establishing trust in the system is a problem that grows exponentially with the number of nodes in the system and is augmented by the number of risk characteristics for each node. Risk characteristics are the aspects of each sub-system (or component) that may reduce the trust that a sub-system is operating as expected. For example, some of these risk characteristics can include: compromised integrity of the code or data; presence of debuggers or rooting utilities; poor behaviour reputation (i.e. hacking events that happen over time); outdated software versions; frequent spikes beyond the normal operating parameters (e.g. open ports with high throughput, massive draw of CPU cycles, persistent and unusually high use of memory); incident history; identification of Distributed Denial of Service (DDOS) attacks; etc.

Therefore, there are clearly security and safety concerns in such systems. In the past, the world of enterprise IT and mobile devices has seen its share of security failures and rebounds. However, the automotive industry cannot afford to fall into the same pitfalls when greater things like safety are at stake—the result of a successful attack against a computer system running in a vehicle could result in human injury or even death. Therefore, as security and safety conditions for operating software in systems such as these are developed and deployed, it is important to be able to systematically identify compromises of parts of the system so that mitigations and fail-safe actions can take place.

Prior approaches to software security have centred on approaches such as perimeter blocking (e.g. firewalls), signature-based identification (e.g. virus scanners), and compliance-driven security (e.g. FIPS 140-2 certification—see https://en.wikipedia.org/wiki/FIPS_140-2, the entire disclosure of which is incorporated herein by reference). While these approaches have evolved over time, they are still in practice. Meanwhile, the computing world has changed drastically over recent years so that we now have, for example: apps running on smartphones; virtual machines; containers; powerful scripts running on browsers; countless IoT (Internet-of-things) devices connecting to the cloud; countless back-end services operating on the cloud; virtual private networks; content in the cloud; fully distributed applications; etc. These developments have now been, or are in the process of being, deployed within vehicles. A more appropriate approach to ensuring security in such environments is required, rather than simply relying on historical approaches to security that have not evolved to cater for the modern deployment scenarios.

Various software protection techniques have been developed to help prevent successful attacks against items of software (or at least to make it substantially more difficult for an attacker to be successful in achieving the aims of their attacks against items of software). Examples of these are set out below, and shall be referred to, in general, as "software protection techniques".

A so-called "white-box" attack environment is an attack model for the execution of an item of software, in which the model identifies that an attacker has various capabilities as described in more detail below (i.e. the attacker can carry out certain actions/operations and has access to certain data). Therefore, if an attacker would have those capabilities when the item of software is actually being executed in a particular execution environment (e.g. using a particular computer/ processor etc.) then one may say that the item of software is executing in a "white-box" environment. In the white-box attack environment, the attacker of the item of software is assumed to have full access to, and visibility of, the data being operated on (including intermediate values), memory contents and execution/process/control flow of the item of software. Moreover, in the white-box attack environment, the attacker is assumed to be able to modify the data being operated on, the memory contents and the execution/process/control flow of the item of software, for example by using a debugger—in this way, the attacker can experiment on, and try to manipulate the operation of, the item of software, with the aim of circumventing initially intended functionality and/or identifying secret information and/or for other purposes. A threat in this context is also known as a Man-at-the-End (MATE) attack.

However, the item of software may need to use or store or generate secret information (e.g. one or more cryptographic keys or identifiers), where this information needs to remain hidden from, or unusable/inaccessible by, the attacker (except as part of the correct/intended functionality of the item of software); the item of software may need to execute different portions of code based on particular decision logic, where it is important to ensure that an attacker cannot force the software to execute one portion of code instead of another portion of code in contradiction to the decision logic; etc. The set-up, configuration and capabilities of the computer system executing the item of software are not necessarily known (or fully known) to, and/or are not controllable (or fully controllable) by, the provider of the item of software, and so it can be assumed that the item of software may end up being executed in a white-box attack environment. This is particularly relevant when the item of software is written in a scripted or interpreted language, such as JavaScript, due to the human-readable nature of scripted or interpreted languages (as opposed to, say, compiled binary executable files)—the user of the computer system can view, monitor and modify execution of such items of software (e.g. during interpretation or after just-in-time compilation), which makes it easy for an attacker to copy and modify the item of software and/or its data or control flow in an attempt to launch an attack against/using the item of software. So-called "white-box protection techniques" are examples of software protection techniques that can be applied to an item of software to generate a protected item of software, with the aim of making it difficult for an attacker to carry out a successful attack on the protected item of software and/or reduce/mitigate the consequences of such an attack by an attacker—i.e. the white-box protection techniques aim to secure the initial item of software against the white-box attack environment.

While cryptography is commonly used in everyday products, it is often the case that very little attention is placed on securing the running software in a hostile environment like an open, unprotected platform where an attacker has full visibility (i.e. a white-box attack environment). If an attacker can access a key from a static database or simply set a break-point in a running item of software to reveal a key, then the item of software may be fully compromised, especially if that key is an important base key of the system, and markedly if that same key is used by every instance of the software (where the attack is then known as a class attack, as it compromises all instances of the software in all deployments of that software).

Side-channel attacks on cryptography are becoming increasingly sophisticated. While originally invented to attack hardware, differential fault analysis (DFA—see https://en.wikipedia.org/wiki/Differential_fault_analysis, the entire disclosure of which is incorporated herein by reference) can also be used on items of software to insert bit-changes to try to reveal keys. Additionally, differential power analysis (DPA—see "Differential Power Analysis," CRYPTO 1999, pages 388-397, the entire disclosure of which is incorporated herein by reference), which reveals patterns in power draw on hardware devices, has been adapted to differential computation analysis (DCA—see "Differential Computation Analysis: Hiding your White-Box Designs is Not Enough," https://eprint.iacr.org/2015/753.pdf, the entire disclosure of which is incorporated herein by reference) for software. DCA looks for statistical patterns in memory accesses to reveal keys. On top of that, it has been shown that very little advance knowledge is needed by the attacker to mount the attack, yet the techniques are remarkably successful at revealing keys in a short amount of time.

There are numerous white-box protection techniques, for transforming an initial item of software so that it is resistant to white-box attacks (i.e. attacks that could be launched, or are available, under the white-box attack environment). Examples of such white-box protection techniques can be found, in "*White-Box Cryptography and an AES Implementation*", S. Chow et al, Selected Areas in Cryptography, 9$^{th}$ Annual International Workshop, SAC 2002, Lecture Notes in Computer Science 2595 (2003), p250-270 and "*A White-box DES Implementation for DRM Applications*", S. Chow et al, Digital Rights Management, ACM CCS-9 Workshop, DRM 2002, Lecture Notes in Computer Science 2696 (2003), p1-15, the entire disclosures of which are incorporated herein by reference. Additional examples can be found in U.S. 61/055,694 and WO2009/140774, the entire disclosures of which are incorporated herein by reference. Some white-box protection techniques (such as those described above and others set out below) enable storage and/or use, and possibly manipulation of, secret/sensitive data (such as cryptographic keys) in a transformed/secured manner from which it is difficult/impossible for an attacker to access or derive the underlying secret/sensitive data. Some white-box protection techniques implement data flow obfuscation—see, for example, U.S. Pat. Nos. 7,350,085, 7,397,916, 6,594,761 and 6,842,862, the entire disclosures of which are incorporated herein by reference. Some white-box protection techniques implement control flow obfuscation—see, for example, U.S. Pat. Nos. 6,779,114, 6,594,761 and 6,842,862 the entire disclosures of which are incorporated herein by reference. Some white-box protection techniques involve input text-dependent memory layouts and data encodings that can form a barrier to DFA and DCA attacks—see, for example, "White-box cryptography: practical protection on hostile hosts", Proceedings of the 6th Workshop on Software Security, Protection, and Reverse Engineering (SSPREW '16). ACM, New York, N.Y., USA, Article 4, https://doi.org/10.1145/3015135.3015139, the entire disclosure of which is incorporated herein by reference. However, it will be appreciated that other white-box protection techniques exist and that these are merely examples.

While cryptography is important, the code/modules implementing the cryptographic algorithms/functionality is inherently inside a large set of logic and code structure that performs the other essential parts of the overall software application. The protection of arbitrary code poses another challenge for the developer. This code is ideally protected from branch-jamming, reverse-engineering, code lifting, and replay attacks.

Code obfuscation is an example software protection technique that aims to make an item of software unintelligible to an attacker. Simple code obfuscation only makes cursory changes over the variable naming and the structure of the item of software, which generally does very little as a barrier for attacking an item of software. On the other hand, transforming an item of software so that it is difficult to reverse, difficult to debug dynamically, and resistant to modifying and replaying, is a much different problem than such simple obfuscation.

As discussed above, some code obfuscation techniques (examples of software protection techniques) provide the ability to perform computations on a hidden form. So-called "data transforms" is a technique to place encodings on data in memory, in stacks, in registers, whether global, local or in arguments, allowing calculations to be performed while retaining the data in an encoded state. This is an important distinction from the original item of software, greatly increasing the difficulty for an attacker to mount static or dynamic attacks. Combining data transforms with control-flow oriented transforms, which conceal the structure of the original item of software, makes it difficult to reverse-engineer the item of software in either a static or dynamic sense. Even if the attacker is able to trace the item of software and reveal data at points of the running item of software, the attacker has difficulty in mapping the values back to an intelligible point of the original item of software. Furthermore, some code obfuscation techniques may introduce redundancies making it extremely difficult for a modification in the item of software to realize a meaningful intended change to the item of software. Moreover, the modification can cause a failure remediation, which could lock the attacker out permanently from the system.

It may be desirable to provide different versions or instances or images of an initial item of software to different computer systems (or different users of computer systems). The different versions of the initial item of software provide the same functionality—however, the different versions of the initial item of software are programmed or implemented differently. This may help limit the impact of an attacker successfully attacking the protected item of software. In particular, if an attacker successfully attacks his version of the protected item of software, then that attack (or data, such as cryptographic keys, discovered or accessed by that attack) may not be suitable for use with different versions of the protected item of software. Similarly, having different protected instances of the initial item of software helps identify specific users (e.g. specific computer systems) of the protected item of software. Consequently, there are numerous software protection techniques, referred to herein as "diversity" techniques, for transforming an initial item of software so that different resultant protected versions of the initial item of software are generated (i.e. so that "diversity" is introduced). Examples of such diversity techniques can be found in WO2011/120123, the entire disclosure of which is incorporated herein by reference. See also "A Compiler-based Infrastructure for Software-Protection", Proceedings of the Third ACM SIG-PLAN Workshop on Programming Languages and Analysis for Security, PLAS '08, pages 33-44, 2008, ACM, ISBN 978-1-59593-936-4, the entire disclosure of which is incorporated herein by reference.

Diversity can be used to provide differing software images in a spatial sense. For example, two of the same CPUs can be loaded with similar function code with structurally different images. Additionally, diversity can be used in a temporal sense on updated software. For example, an attacker may try to glean information from the differences in a software update—software diversity allows a developer to blend changed code with existing unchanged code to create a (slightly) larger update, where it looks like all (or at least more) of the code has changed, thereby making it more challenged for the attacker to devise and launch an attack.

An important protection goal is often to ascertain the operational correctness of an item of software (i.e. how intact the software is when operating). This is often referred to as integrity verification, or IV, (see, for example, https://en.wikipedia.org/wiki/File_verification, the entire disclosure of which is incorporated herein by reference). IV techniques (another software protection technique) aim to ensure that the item of software executed at runtime is the version released by the supplier of the item of software. This helps the end-user or a service provider or another entity to trust that an original/authentic copy of the item of software is executing instead of a modified version (e.g. a version containing malware). IV aims to ensure that the code of the item of software is the same as the code that is originally deployed and that this is true even in memory at runtime.

The traditional approach to IV is to compute a value based on some or all of the original code of the item of software, when this code is read as data—this value could, for example, be calculated as a checksum or hash or a cryptographically strong hash of the code that has been read. Use of a cryptographically strong hash makes it infeasible for the attacker to modify the code whilst maintaining the original hash-value—hence, a modification to the code can be identified by detecting an incorrect or unexpected hash-value. Such IV can be carried out by an IV module that has been incorporated, say, into the item of software or that is executing as a separate process.

Another approach to IV involves signing code segments of the item of software with a set of digital signatures. In the native form, these signatures reside in a protected, encrypted voucher, either in a separate file or concatenated directly to the binary.

In a connected scenario, the integrity principle is the same, but can be constructed in a different arrangement. The build-time signatures (i.e., golden signatures) can be kept in a place away from where the runtime signatures are being calculated, where they have a lower risk of being compromised. For example, this can be on a server back-end which can perform analysis and which may also have the ability to control aspects of the system and perform updates and maintenance. These golden signatures could also be distributed among a network of nodes, to be accessed only through secrets in a need-to-know manner. Detaching integrity information from the system under check to places where other entities need to determine trust elevates the security and robustness of the system.

Other approaches to IV are disclosed, for example, in WO2015/149828 (the entire disclosure of which is incorporated herein by reference). With this approach, a secured item of software comprises assertion tests that verify whether a predetermined invariant condition holds. These checks on invariant conditions increase the integrity of the item of software as attacker modifications are likely to cause an invariant property to fail.

Another approach to IV is disclosed in PCT/EP2016/081164 (the entire disclosure of which is incorporated herein by reference).

The developer has control over the failure-response (i.e. how to respond when the IV techniques identify that some or all of the code of the item of software is not the originally intended/provided code). For example, a typical response is to cripple the item of software if the integrity check fails. Another response is to alert another part of the system.

As another example software protection technique, it is possible that the initial item of software may be intended to be provided (or distributed) to, and used by, a particular computer system (or a particular set of computer systems) and that it is, therefore, desirable to "lock" the initial item of software to the particular computer system(s), i.e. to prevent the initial item of software (once protected) from executing on another computer system. Consequently, there are numerous software protection techniques, referred to herein as "node-locking" protection techniques, for transforming the initial item of software so that the protected item of software can execute on (or be executed by) one or more predetermined/specific computer systems but will not execute on other computer systems. Examples of such node-locking techniques can be found in WO2012/126077, the entire disclosure of which is incorporated herein by reference.

Digital watermarking is a well-known technology. In particular, digital watermarking involves modifying an initial digital object to produce a watermarked digital object. The modifications are made so as to embed or hide particular data (referred to as payload data) into the initial digital object. The payload data may, for example, comprise data identifying ownership rights or other rights information for the digital object. The payload data may identify the (intended) recipient of the watermarked digital object, in which case the payload data is referred to as a digital fingerprint—such digital watermarking can be used to help trace the origin of unauthorised copies of the digital object. Digital watermarking can be applied to items of software, and is therefore an example software protection technique. Examples of such software watermarking techniques can be found in U.S. Pat. No. 7,395,433, the entire disclosure of which is incorporated herein by reference.

On unix-based systems, history has shown that it is often sufficient for an attacker to gain root privileges to have unlimited power to make changes to a running system. Attackers can use a stockpile of tools to directly attack running applications, including debuggers and analyzers like IDAPro, gdb, and radare2. Even in unix cases which are further locked down with techniques like sandboxing (i.e. DAC) and mandatory access control (i.e. MAC) like SMACK and SELinux, attackers can exploit the system. For example, in Android, which uses SELinux, attackers have been known to create hooking utilities like CydiaSubstrate and the Xposed framework, allowing them to alter behaviour at points of interest.

Software protection techniques can be implemented as a defence against these types of direct attack. Such techniques can include features like: root detection, which can identify if a device has been rooted and then take appropriate actions; anti-hooking techniques that determine if methods or functions have been redirected to sources unintended by the software author; anti-debug techniques that can infringe on the regular operation of debuggers by using up their needed resources, including making generous use of signals or denying attachments with ptrace; etc.

Some software protection techniques aim to ensure the integrity of the underlying operating system (OS). This may be implemented at multiple points including integrity checks performed on the OS kernel, modules and system libraries on disk at load time. This on-load integrity verification is enforced for all applications on the system, establishing the applications' processes as trusted before allowing their execution. This integrity verification mechanism may leverage white-box implementations of AES and SHA1 for fast and secure integrity verification. The use of the FUSE framework results in efficient calculation of integrity along with the system's usual page cache.

The software protection techniques may also cover anti-reverse engineering of the deployed binaries and of elements themselves. Critical applications can be encrypted on media and are only decrypted into memory. The elements themselves may be built using compiler transforms and anti-tampering described above. Additionally, the in-memory data of the system (both process and OS kernel memory) may be protected from siphoning and modification, even by the root user. Lastly, anti-debug protections may be used to prevent the use of a debugger on the system, even by root. In turn, this realizes some of the aforementioned protections but also thwarts process state manipulations and dynamic analysis on the system.

Some of the software protection techniques described above are realized by a capability enforcement element, which replaces the root user as the administrator of the policies and also replaces the tools associated with the Loadable Security Modules (LSM) on protected systems. In this way, the secured environment can realize useful privilege separation even on systems that have not been designed with user-separation (that is, where everything runs as root).

The detection mechanisms provided by the secured environment may be able to catch attempted breaches of the above protections, among other detectable security conditions. Detection of attempts to run tampered or unsigned binaries serves as a very useful intrusion detection mechanism; however, tampering detection is not limited to on-load checks. The secured environment may perform continuous monitoring of running processes to check for signs of tampering using the same integrity verification technology.

Another detection mechanism, a service watchdog, is responsible for monitoring the health and status of the other elements the environment. Each element communicates using a common message bus, and the service watchdog ensures proper operation of these as well as the message bus itself with purpose-built messages for the elements. The elements being monitored are, in turn, monitoring the service watchdog which entangles the ongoing operation of the elements together. In this way, switching off any one element is extremely difficult on a running system.

The above-mentioned software protection techniques are introduced purely as examples—it will be appreciated that other techniques for trying to protect an item of software exist and fall under the umbrella of the term "software protection techniques". There are numerous ways in which the above-mentioned software protection techniques may be applied to an initial item of software. For example, to protect an initial item of software, a protection tool may modify one or more software elements within the initial item of software and/or may add or introduce one or more new software elements into the initial item of software. The actual way in which these modifications are made or the actual way in which the new software elements are written can, of course, vary—there are, after all, an infinite number of ways of writing software to achieve the same functionality. Numerous examples and methods for implementing a protection tool that enables generation of protected items of software from initial items of software can be found, for example, in WO2015/150391 and WO2015/150376, the entire disclosures of which are incorporated herein by reference. Further examples of software protection techniques that such a protection tool may be arranged to apply can be found in WO2013/142981, WO2013/142979, WO2013/142983 and WO2013/142980, the entire disclosures of which are incorporated herein by reference.

SUMMARY OF THE INVENTION

Embodiments of the invention aim to address various security-related issues discussed above.

In general, embodiments of the invention provide an approach for self-protection of a networked system enabled through tamper-proofing technologies communicating through a distributed ledger. Use may be made of software protection technologies including runtime application self-protection, anti-debug, anti-hooking, root detection, and OS-level protections combined with white-box cryptography and program transforms. Hard facts and tamper evidence may be placed in a distributed integrity ledger. The consensus network used to maintain the ledger therefore contains explicit state information which is continuously available throughout and retained in a tamper-evident log. Constant disposal of this health information means that the system can be back-ended by logging and monitoring, or by machine learning algorithms, enabling possible reactions like sending commands (e.g. go to fail-safe mode, shutdown, fail-over to backup system) or sending (over-the-air) updates.

According to a first aspect of the invention, there is provided a method of operating a system, wherein the system comprises a plurality of components, the method comprising: maintaining a distributed ledger, wherein the distributed ledger comprises data records, wherein each data record stores information concerning one or more respective components of the plurality of components; at least one component of the plurality of components processing the information stored in one or more respective data records of the distributed ledger to determine whether the system meets one or more respective security criteria; and one or both of: (i) the at least one component performing a respective first action if the at least one component determines that the system meets the one or more respective security criteria; and (ii) the at least one component performing a respective second action if the at least one component determines that the system does not meet the one or more respective security criteria.

The method may comprise the at least one component determining whether or not to perform an operation as part of said operating the system, wherein: said determining whether or not to perform the operation comprises said processing the information stored in one or more respective data records of the distributed ledger to determine whether the system meets one or more respective security criteria; said first action comprises enabling performance of the operation; said second action comprises preventing performance of the operation.

The method may comprise the at least one component repeatedly performing said processing the information stored in one or more respective data records of the distributed ledger to determine whether the system meets one or more respective security criteria according to respective security check timing conditions.

In some embodiments, for one or more data records of the distributed ledger, the respective information comprises data indicating, for at least one of the respective components, a result of a corresponding integrity check of that component. In some such embodiments, for each of said at least one of the respective components, said component performs said corresponding integrity check. In some such embodiments, for each of said at least one of the respective components, said component repeatedly performs said corresponding integrity check, wherein the data records of the distributed ledger comprise, for each of the integrity checks performed by said component, a corresponding data record that comprises data indicating a result of that integrity check.

The method may comprise at least one component of the plurality of components updating the one or more respective security criteria based on an analysis of the distributed ledger. Said updating may comprise one or more of: (a) deleting at least one of the one or more respective security criteria; (b) adding at least one additional security criterion to the one or more respective security criteria; (c) modifying at least one of the one or more respective security criteria; (d) changing the one or more respective security criteria to improve the operational security of the system.

According to a second aspect of the invention, there is provided a method of operating a component of a plurality of components of a system, wherein the system maintains a distributed ledger, wherein the distributed ledger comprises data records, wherein each data record stores information concerning one or more respective components of the plurality of components, wherein said method comprises: said component processing the information stored in one or more respective data records of the distributed ledger to determine whether the system meets one or more respective security criteria; and one or both of: (i) said component performing a respective first action if said component determines that the system meets the one or more respective security criteria; and (ii) said component performing a respective second action if said component determines that the system does not meet the one or more respective security criteria.

The method may comprise said component determining whether or not to perform an operation as part of operating the system, wherein: said determining whether or not to perform the operation comprises said processing the information stored in one or more respective data records of the distributed ledger to determine whether the system meets one or more respective security criteria; said first action comprises enabling performance of the operation; said second action comprises preventing performance of the operation.

The method may comprise said component repeatedly performing said processing the information stored in one or more respective data records of the distributed ledger to determine whether the system meets one or more respective security criteria according to respective security check timing conditions.

In some embodiments, for one or more data records of the distributed ledger, the respective information comprises data indicating, for at least one of the respective components, a result of a corresponding integrity check of that component.

The method may comprise updating the one or more respective security criteria based on an analysis of the distributed ledger. Said updating may comprise one or more of: (a) deleting at least one of the one or more respective security criteria; (b) adding at least one additional security criterion to the one or more respective security criteria; (c) modifying at least one of the one or more respective security criteria; (d) changing the one or more respective security criteria to improve the operational security of the system.

In some embodiments of the first and second aspects, said second action comprises causing a warning message to be generated.

In some embodiments of the first and second aspects, said second action comprises preventing the system from carrying out one or more operations that would otherwise be part of said operating the system.

In some embodiments of the first and second aspects, said first action comprises allowing the system to carry out one or more operations as part of said operating the system.

In some embodiments of the first and second aspects, for one or more data records of the distributed ledger, the respective information concerning one or more respective components comprises data indicating one or more of: (a) an identity of at least one of said one or more respective components; (b) a version of at least one of said one or more respective components; (c) a date of installation as part of the system of at least one of said one or more respective components; (d) a date of update of at least one of said one or more respective components; (e) a result of a security test carried out by at least one of said one or more respective components; (f) data relating to the security of the system; (g) data identifying security characteristics of, or identifying security events of, the system; (h) data relating to an operational norm of one or more components of the plurality of components; (i) data relating to performance or operational characteristics of one or more components of the plurality of components.

Some embodiments of the first and second aspects comprise displaying, to a user, data based at least in part on said determination of whether the system meets one or more respective security criteria.

In some embodiments of the first and second aspects, one or more of the components of the system are respective items of software executable by the system.

In some embodiments of the first and second aspects, one or more of the components of the system are respective hardware elements.

In some embodiments of the first and second aspects, the distributed ledger is a distributed data store arranged so that: (a) each of the data records of the distributed ledger is, respectively, replicated at multiple components of the plurality of components of the system; and (b) each of the data records of the distributed ledger is stored as part of the distributed ledger after, respectively, multiple components of the plurality of components of the system have together reached consensus on that data record. The distributed ledger may be cryptographically protected so that authenticity and/or integrity of the data records of the distributed ledger can be verified. Said cryptographic protection of the distributed ledger may involve using one or more of: blockchains; or chaining the data records and storing, as part of a data record, a hash of a previous data record; encrypting at least some of the information of the data records; digitally signing at least some of the information of the data records.

In some embodiments of the first and second aspects, the system is part of one or more vehicles.

In some embodiments of the first and second aspects, the system comprises one or more networks to enable communication of data between the plurality of components to thereby carry out said maintaining the distributed ledger.

In some embodiments of the first and second aspects, the one or more security criteria comprise one or more of the following: (a) a criterion that a particular component of the plurality of components is a predetermined version of that component; (b) a criterion that a particular component of the plurality of components is at least a predetermined minimum version of that component; (c) a criterion that, for one or more components of the plurality of components, a corresponding integrity check of that component indicates that that component has not been compromised; (d) a criterion that, for one or more software components of the plurality of components, a corresponding anti-debugging check of that component indicates that that component either is not or has not been executed within a debugger; (e) a criterion that, for one or more components of the plurality of components, a corresponding anti-hooking check of that component indicates that that component either is not or has not experienced hooking; (f) a criterion that, for one or more components of the plurality of components, corresponding resource usage is less than a predetermined threshold; (g) a criterion that, for one or more components of the plurality of components, a security check in relation to that component has been successfully conducted sufficiently recently; (h) a criterion that the current performance characteristics of one or more components of the plurality of components correspond to expected performance characteristics of those one or more components.

According to a third aspect of the invention, there if provided a system comprising a plurality of components, wherein: the system is arranged to maintain a distributed ledger, wherein the distributed ledger comprises data records, wherein each data record stores information concerning one or more respective components of the plurality of components; at least one component of the plurality of components is arranged to process the information stored in one or more respective data records of the distributed ledger to determine whether the system meets one or more respective security criteria; and one or both of: (i) the at least one component is arranged to perform a respective first action if the at least one component determines that the system meets the one or more respective security criteria; and (ii) the at least one component is arranged to perform a respective second action if the at least one component determines that the system does not meet the one or more respective security criteria.

The at least one component may be arranged to determine whether or not to perform an operation as part of said operating the system, wherein: said determining whether or not to perform the operation comprises said processing the information stored in one or more respective data records of the distributed ledger to determine whether the system meets one or more respective security criteria; said first action comprises enabling performance of the operation; said second action comprises preventing performance of the operation.

The at least one component may be arranged to repeatedly perform said processing the information stored in one or more respective data records of the distributed ledger to determine whether the system meets one or more respective security criteria according to respective security check timing conditions.

In some embodiments, for one or more data records of the distributed ledger, the respective information comprises data indicating, for at least one of the respective components, a result of a corresponding integrity check of that component.

In some embodiments, for each of said at least one of the respective components, said component is arranged to perform said corresponding integrity check.

In some embodiments, for each of said at least one of the respective components, said component is arranged to repeatedly perform said corresponding integrity check, wherein the data records of the distributed ledger comprise, for each of the integrity checks performed by said component, a corresponding data record that comprises data indicating a result of that integrity check.

In some embodiments, at least one component of the plurality of components is arranged to update the one or more respective security criteria based on an analysis of the distributed ledger. Said update may comprises one or more of: (a) deletion of at least one of the one or more respective security criteria; (b) addition of at least one additional security criterion to the one or more respective security criteria; (c) modification of at least one of the one or more respective security criteria; (d) change to the one or more respective security criteria to improve the operational security of the system.

In some embodiments, said second action comprises causing a warning message to be generated.

In some embodiments, said second action comprises preventing the system from carrying out one or more operations that would otherwise be part of said operating the system.

In some embodiments, said first action comprises allowing the system to carry out one or more operations as part of said operating the system.

In some embodiments, for one or more data records of the distributed ledger, the respective information concerning one or more respective components comprises data indicating one or more of: (a) an identity of at least one of said one or more respective components; (b) a version of at least one of said one or more respective components; (c) a date of installation as part of the system of at least one of said one or more respective components; (d) a date of update of at least one of said one or more respective components; (e) a result of a security test carried out by at least one of said one or more respective components; (f) data relating to the security of the system; (g) data identifying security characteristics of, or identifying security events of, the system; (h) data relating to an operational norm of one or more components of the plurality of components; (i) data relating to performance or operational characteristics of one or more components of the plurality of components.

In some embodiments, the system is arranged to display, to a user, data based at least in part on said determination of whether the system meets one or more respective security criteria.

In some embodiments, one or more of the components of the system are respective items of software executable by the system.

In some embodiments, one or more of the components of the system are respective hardware elements.

In some embodiments, wherein the distributed ledger is a distributed data store arranged so that: (a) each of the data records of the distributed ledger is, respectively, replicated at multiple components of the plurality of components of the system; and (b) each of the data records of the distributed ledger is stored as part of the distributed ledger after, respectively, multiple components of the plurality of components of the system have together reached consensus on that data record. The distributed ledger may be cryptographically protected so that authenticity and/or integrity of the data records of the distributed ledger can be verified. Said cryptographic protection of the distributed ledger may involve using one or more of: blockchains; chaining the data records and storing, as part of a data record, a hash of a previous data record; encrypting at least some of the information of the data records; digitally signing at least some of the information of the data records.

In some embodiments, the system is part of one or more vehicles.

In some embodiments, the system comprises one or more networks to enable communication of data between the plurality of components to thereby carry out said maintaining the distributed ledger.

In some embodiments, the one or more security criteria comprise one or more of the following: (a) a criterion that a particular component of the plurality of components is a predetermined version of that component; (b) a criterion that a particular component of the plurality of components is at least a predetermined minimum version of that component; (c) a criterion that, for one or more components of the plurality of components, a corresponding integrity check of that component indicates that that component has not been compromised; (d) a criterion that, for one or more software components of the plurality of components, a corresponding anti-debugging check of that component indicates that that component either is not or has not been executed within a debugger; (e) a criterion that, for one or more components of the plurality of components, a corresponding anti-hooking check of that component indicates that that component either is not or has not experienced hooking; (f) a criterion that, for one or more components of the plurality of components, corresponding resource usage is less than a predetermined threshold; (g) a criterion that, for one or more components of the plurality of components, a security check in relation to that component has been successfully conducted sufficiently recently; (h) a criterion that the current performance characteristics of one or more components of the plurality of components correspond to expected performance characteristics of those one or more components.

According to a fourth aspect of the invention, there is provided a component of system, the system comprising a plurality of components, wherein the system maintains a distributed ledger, wherein the distributed ledger comprises data records, wherein each data record stores information concerning one or more respective components of the plurality of components, wherein said component is arranged to: process the information stored in one or more respective data records of the distributed ledger to determine whether the system meets one or more respective security criteria; and one or both of: (i) perform a respective first action if said component determines that the system meets the one or more respective security criteria; and (ii) perform a respective second action if said component determines that the system does not meet the one or more respective security criteria.

In some embodiments, said component is arranged to determine whether or not to perform an operation as part of operating the system, wherein: said determining whether or not to perform the operation comprises said processing the information stored in one or more respective data records of the distributed ledger to determine whether the system meets one or more respective security criteria; said first action comprises enabling performance of the operation; said second action comprises preventing performance of the operation.

In some embodiments, said component is arranged to repeatedly perform said processing the information stored in one or more respective data records of the distributed ledger to determine whether the system meets one or more respective security criteria according to respective security check timing conditions.

In some embodiments, for one or more data records of the distributed ledger, the respective information comprises data indicating, for at least one of the respective components, a result of a corresponding integrity check of that component.

In some embodiments, said component is arranged to update the one or more respective security criteria based on an analysis of the distributed ledger. Said update may comprise one or more of: (a) deletion of at least one of the one or more respective security criteria; (b) addition of at least one additional security criterion to the one or more respective security criteria; (c) modification of at least one of the one or more respective security criteria; (d) change to the one or more respective security criteria to improve the operational security of the system.

In some embodiments, said second action comprises causing a warning message to be generated.

In some embodiments, said second action comprises preventing the system from carrying out one or more operations that would otherwise be part of said operating the system.

In some embodiments, said first action comprises allowing the system to carry out one or more operations as part of said operating the system.

In some embodiments, for one or more data records of the distributed ledger, the respective information concerning one or more respective components comprises data indicating one or more of: (a) an identity of at least one of said one or more respective components; (b) a version of at least one of said one or more respective components; (c) a date of installation as part of the system of at least one of said one or more respective components; (d) a date of update of at least one of said one or more respective components; (e) a result of a security test carried out by at least one of said one or more respective components; (f) data relating to the security of the system; (g) data identifying security characteristics of, or identifying security events of, the system; (h) data relating to an operational norm of one or more components of the plurality of components; (i) data relating to performance or operational characteristics of one or more components of the plurality of components.

In some embodiments, the component is arranged to display, to a user, data based at least in part on said determination of whether the system meets one or more respective security criteria.

In some embodiments, one or more of the components of the system are respective items of software executable by the system.

In some embodiments, one or more of the components of the system are respective hardware elements.

In some embodiments, the distributed ledger is a distributed data store arranged so that: (a) each of the data records of the distributed ledger is, respectively, replicated at multiple components of the plurality of components of the system; and (b) each of the data records of the distributed ledger is stored as part of the distributed ledger after, respectively, multiple components of the plurality of components of the system have together reached consensus on that data record. The distributed ledger may be cryptographically protected so that authenticity and/or integrity of the data records of the distributed ledger can be verified. Said cryptographic protection of the distributed ledger involves using one or more of: blockchains; chaining the data records and storing, as part of a data record, a hash of a previous data record; encrypting at least some of the information of the data records; digitally signing at least some of the information of the data records.

In some embodiments, the system is part of one or more vehicles.

In some embodiments, the system comprises one or more networks to enable communication of data between the plurality of components to thereby carry out said maintaining the distributed ledger.

In some embodiments, the one or more security criteria comprise one or more of the following: (a) a criterion that a particular component of the plurality of components is a predetermined version of that component; (b) a criterion that a particular component of the plurality of components is at least a predetermined minimum version of that component; (c) a criterion that, for one or more components of the plurality of components, a corresponding integrity check of that component indicates that that component has not been compromised; (d) a criterion that, for one or more software components of the plurality of components, a corresponding anti-debugging check of that component indicates that that component either is not or has not been executed within a debugger; (e) a criterion that, for one or more components of the plurality of components, a corresponding anti-hooking check of that component indicates that that component either is not or has not experienced hooking; (f) a criterion that, for one or more components of the plurality of components, corresponding resource usage is less than a predetermined threshold; (g) a criterion that, for one or more components of the plurality of components, a security check in relation to that component has been successfully conducted sufficiently recently; (h) a criterion that the current performance characteristics of one or more components of the plurality of components correspond to expected performance characteristics of those one or more components.

According to a fifth aspect of the invention, there is provided a vehicle comprising either a system according to the third aspect (or embodiments thereof) or one or more components according to the fourth aspect (or embodiments thereof).

According to a sixth aspect of the invention, there is provided a computer program which, when executed by one or more processors, is arranged to carry out a method according to any one of the first and second aspects, or embodiments thereof. The computer program may be stored on a computer readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
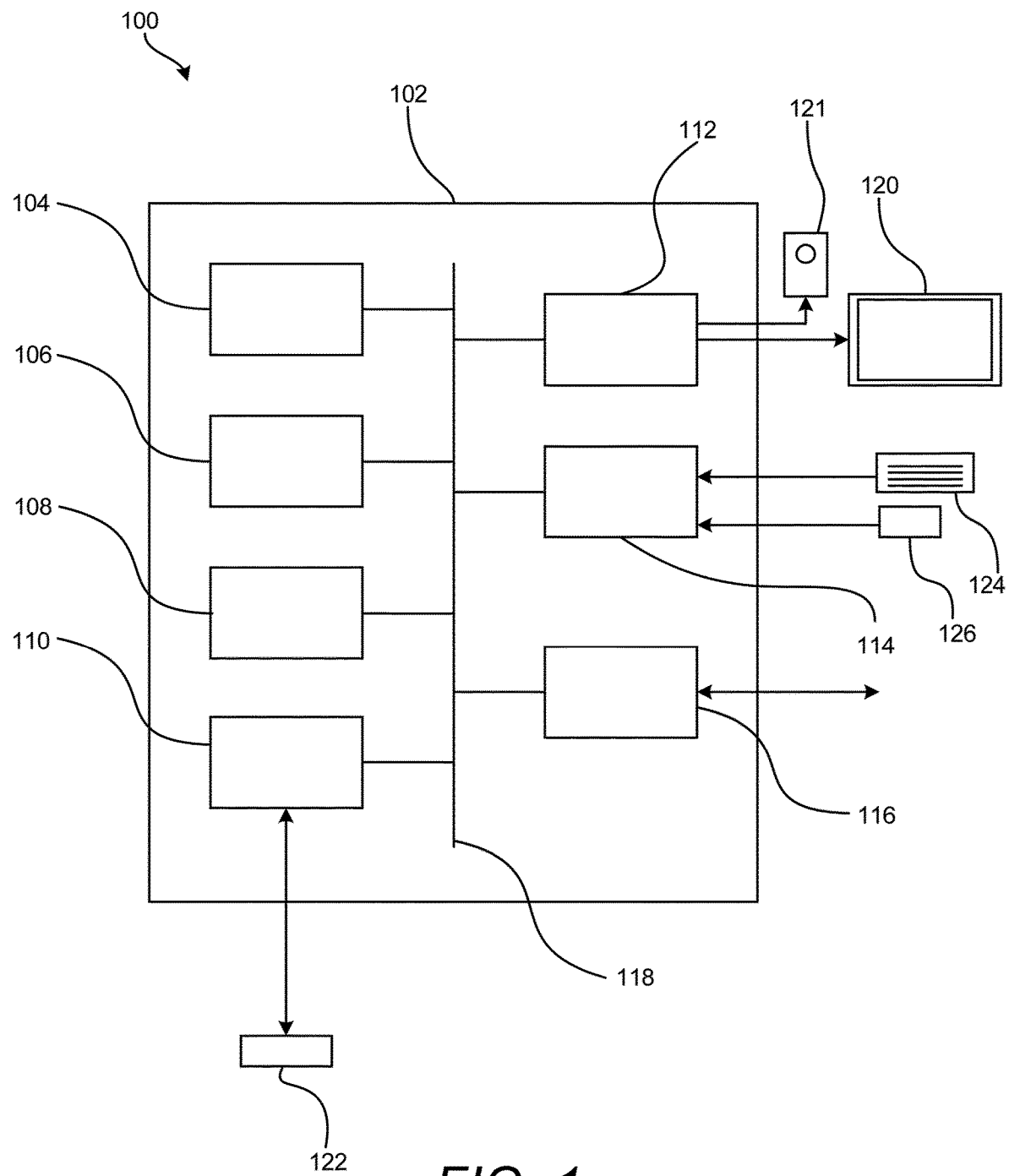
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, a solid-state-storage device, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The device 122 may be a sensor operable to provide data to the computer 102. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc. Likewise, the computer system 100 could comprise one or more smart-devices which may have considerably fewer components than shown in FIG. 1—for example, the computer system 100 could be: a thermostat with network connectivity (and which, therefore, may not have any mechanism for user output); a refrigerator with network connectivity; a lightbulb with network connectivity (and which, therefore, may not have any mechanism for user input or output, other than, of course, via the light it emits); other IoT devices; etc.

Figure 2A:
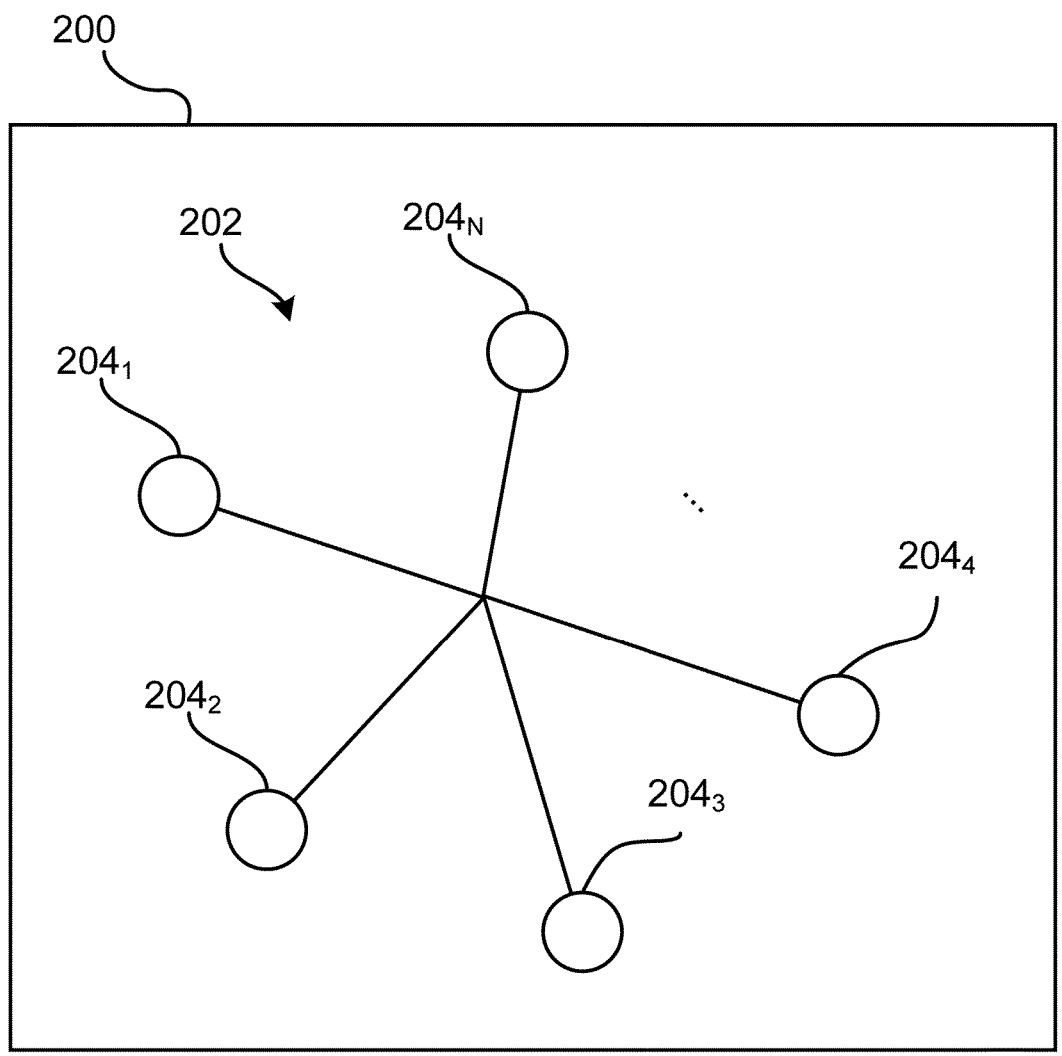
FIG. 2a schematically illustrates a system according to an embodiment of the invention.

FIG. 2a schematically illustrates a system 200 according to an embodiment of the invention. The system 200 comprises a plurality of components (or sub-systems or elements) 204. In FIG. 2a, N components are shown, namely the components $204_j$ (j=1, ..., N). N may be any integer greater than 1.

One or more of the components 204 of the system 200 may be respective items of software executable by the system 200. Herein, each "item of software" may, respectively, comprise one or more of: one or more software applications; one or more software libraries; one or more software modules; one or more software functions or procedures or routines; one or more code snippets; etc. Each item of software may comprise respective "code" (i.e. instructions/commands of the item of software) and/or data and/or other resources—thus, execution of the "code" (or execution of the item of software) comprises executing some or all of these instructions/commands, where this execution might potentially involve using some of the data and/or other resources if present in the item of software. The term "software element" as used herein in relation to an item of software refers to code and/or other components (e.g. data and/or other resources/assets) of the item of software. Thus, a software element of (or for) an item of software may comprise (a) one or more pieces of code (e.g. one or more instructions/commands) of (or for) the item of software, and/or (b) one or more pieces of data or other resources of (or for) the item of software. Each item of software may, respectively, be or comprise one or more of: a compiled (binary) executable file or a native application (e.g. software elements initially written in a language such as C or C++ and subsequently compiled); source code (i.e. software elements in an interpreted or scripted language, such as JavaScript, Ruby, Perl, python, bash, PHP, tcl, etc.); software elements in a language used by a virtual machine (such as Java); loadable kernel modules; kernel memory; etc.

Additionally or alternatively, one or more of the components 204 of the system 200 may be, or may comprise, respective hardware elements. Each such hardware element may comprise one or more of: one or more computer systems, such as the computer system 100 of FIG. 1; one or more processors (such as CPUs, GPUs, ASICs, FPGAs, DSPs, etc.); one or more smartcards; one or more mobile devices (such as tablets, laptops, mobile telephones); etc.

The components 204 of the system 200 may, together, be viewed as forming a network 202. Thus, the components 204 may be viewed as nodes of the network 202 (and shall be referred to herein from time to time as "nodes" as appropriate).

The system 200 may take many forms. For example:
- The system 200 may be a computer system 100. In this example, each component 204 is, respectively, a hardware component (such as one or more of those illustrated in FIG. 1) and/or a software component (such as one or more items of software stored at, and executed by, the computer system 100).
- The system 200 may comprise multiple computer systems 100, such as a network of one or more of: servers, user computers, televisions, routers, door-bells, refrigerators, other smart-devices (or IoT devices), etc. Such a network could be, for example, a home network, an enterprise network, a cloud infrastructure, a collection of virtual machines, web server components, etc. In this example, each component 204 is, respectively, a hardware component (such as one or more of those illustrated in FIG. 1) of one or more of those computer systems 100 and/or a software component (such as one or more items of software stored at, and executed by, one or more of those computer systems 100).
- The system 200 may be, or may form part of, a vehicle (such as a car, truck, train, bus, boat, aircraft, satellite, etc.), whereby each component 204 is, respectively, a hardware component (such as one or more of an ECU, IVI, CPU, satnav, mobile telephone, etc.) and/or a software component (such as one or more items of software stored at, and executed by, one or more processing units of the vehicle).
- The system 200 may be, or may form part of, a plurality of vehicles whereby each component 204 is, respectively, a hardware component (such as a vehicle in and of itself, or an ECU, IVI, CPU, satnav, mobile telephone, etc. of such a vehicle) and/or a software component (such as one or more items of software stored at, and executed by, one or more of processing units of the vehicles).
- It will be appreciated that the system 200 of components 204 may take many other forms.

The system 200 may comprise one or more data communication networks (not shown in FIG. 2a) to enable communication of data between the components 204. As shall become apparent from the discussion below, such communication enables the components 204 to maintain a so-called "distributed ledger". Such communication network(s) could comprise one or more of: a local area network, a wide area network, a metropolitan area network, the internet, a wireless communications network, a cable network, a digital broadcast network, a satellite communication network, a telephone network, etc. The components 204 may communicate over the network(s) via any suitable communication mechanism/protocol in order to communicate data with each other, such as: Ethernet; TCP-IP; UDP; and, where vehicles are involved, in-vehicle network protocols such as CAN, LIN and FlexRay.

Figure 3:
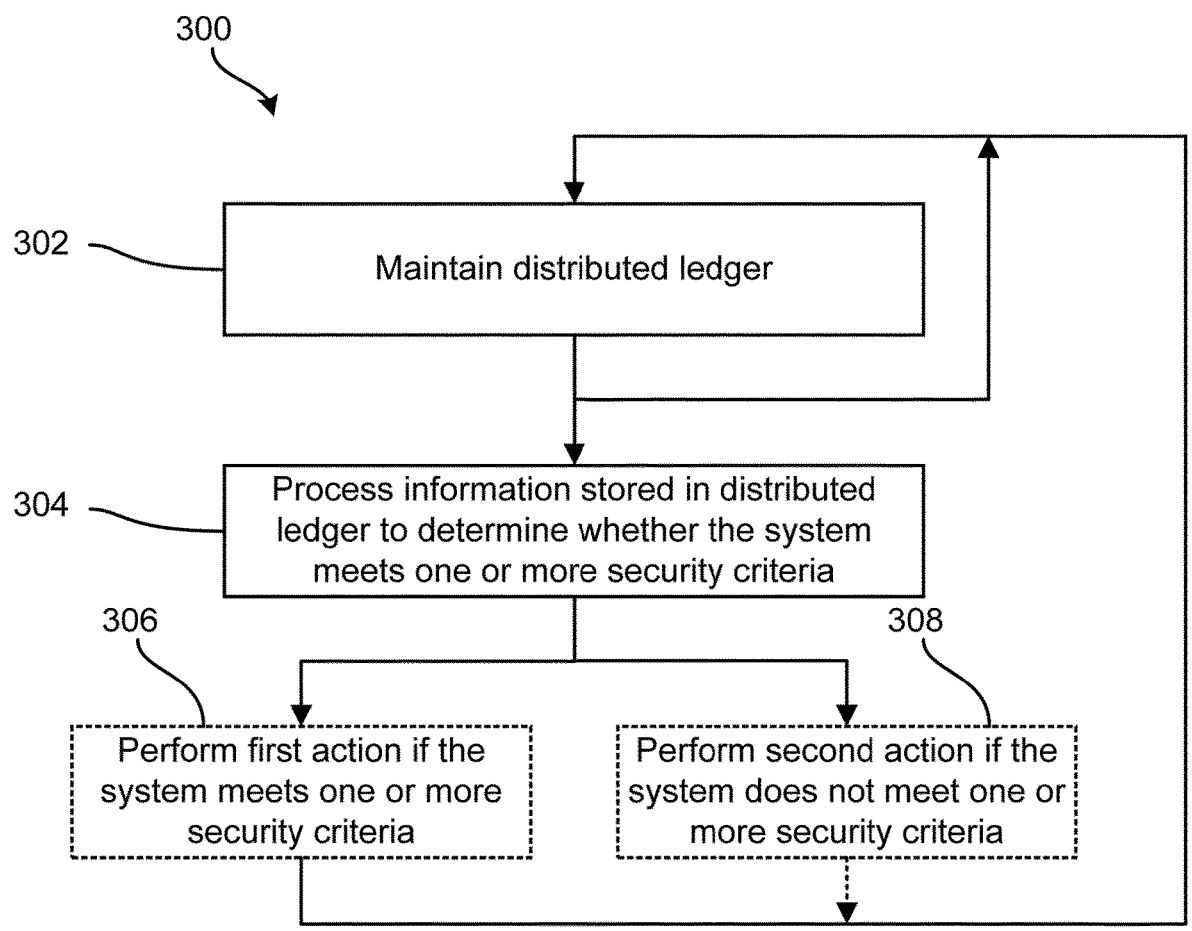
FIG. 3 is a flow diagram schematically illustrating a method of operating (or running or managing) a system according to an embodiment of the invention.

FIG. 3 is a flow diagram schematically illustrating a method of operating (or running or managing) the system 200 according to an embodiment of the invention.

At a step 302, the system 200 maintains a so-called distributed ledger. The distributed ledger comprises data records, wherein each data record stores information concerning one or more respective components 204 of the plurality of components 204 of the system 200. The nature of the distributed ledger shall be discussed in more detail shortly.

The maintenance of the distributed ledger may be an on-going process, as shown in FIG. 3 by the arrow exiting the step 302 and re-entering the step 302.

At some stage during the operation of the system 200, at least one component 204 of the plurality of components 204 of the system 200 processes the information stored in one or more respective data records of the distributed ledger. This processing is to determine whether the system 200 meets one or more respective security criteria. Each component 204 that carries out the step 304 may use its own respective security criteria. Two or more components 204 that carry out the step 304 may use the same security criteria. The security criteria used by a component 204 when performing the step 304 at one point in time may be different from the security criteria use by that same component 204 when performing the step 304 at a different point in time—for example, if the component 204 is a software module, then the security criteria used at one point in the code of the module may be different from the security criteria used at a different point in the code of the module.

The method 300 may comprise one or both of steps 306 and 308—they are, therefore, shown in FIG. 3 with dotted lines, indicating that they are optional in some embodiments of the invention.

At the step 306, the at least one component 204 that carried out the step 304 performs a respective first action if the at least one component 204 determined (at the step 304) that the system 200 meets the one or more respective security criteria. It will be appreciated that the step 306 is optional. For example, the step 304 may be carried out by a component 204 that is designed to cause an alarm to be raised, or cause the system 200 to enter a fail-safe mode of operation, if the security criteria are not met—therefore, if the security criteria are met, then no action needs to be taken. In contrast, the step 304 may be carried out by a component 204 that wishes to carry out a certain operation (e.g. accessing sensitive data) that should only be carried out if the component 204 is satisfied that the system 200 is sufficiently secure—therefore, if the security criteria are met, then that operation may be carried out as the "first action".

At the step 308, the at least one component 204 that carried out the step 304 performs a respective second action if the at least one component 204 determined (at the step 304) that the system 200 does not meet the one or more respective security criteria. It will be appreciated that the step 308 is optional. For example, the step 304 may be carried out by a component 204 that wishes to carry out a certain operation (e.g. accessing sensitive data) that should only be carried out if the component 204 is satisfied that the system 200 is sufficiently secure—therefore, if the security criteria are not met, then that operation is not carried out. In contrast, the step 304 may be carried out by a component 204 that is designed to cause an alarm to be raised, or cause the system 200 to enter a fail-safe mode of operation, if the security criteria are not met—therefore, if the security criteria are not met, then the alarm may be raised or the fail-safe mode entered as the "second action".

FIG. 3 shows the processing returning to the step 302 after the step 306 has been carried out. FIG. 3 shows that the processing may return to the step 302 after the step 308 has been carried out—this is shown as an optional step because, in some embodiments, the second action carried out at the step 308 may cause the system 200 to cease operating (and hence the maintenance of the distributed ledger may be halted).

Whilst FIG. 3 shows the maintenance of the distributed ledger at the step 302 as part of a sequential flow of steps with the other steps 304, 306 and 308 of the method 300, it will be appreciated that the step 302 may be executed in parallel (e.g. as a separate process/procedure) from the steps 304, 306 and 308. Indeed, the maintenance of the distributed ledger is (as shall be discussed below) achieved collectively by the components 204 of the system 200, whereas the steps 304, 306 and 308 may be carried out at a point in time, by one or more components 204 of the system 200, that is independent of any timing of the maintenance carried out at the step 302. The illustration in FIG. 3 is, therefore, purely for ease of illustration, and is not necessarily indicative of the actual sequence of processing steps.

Figure 4:
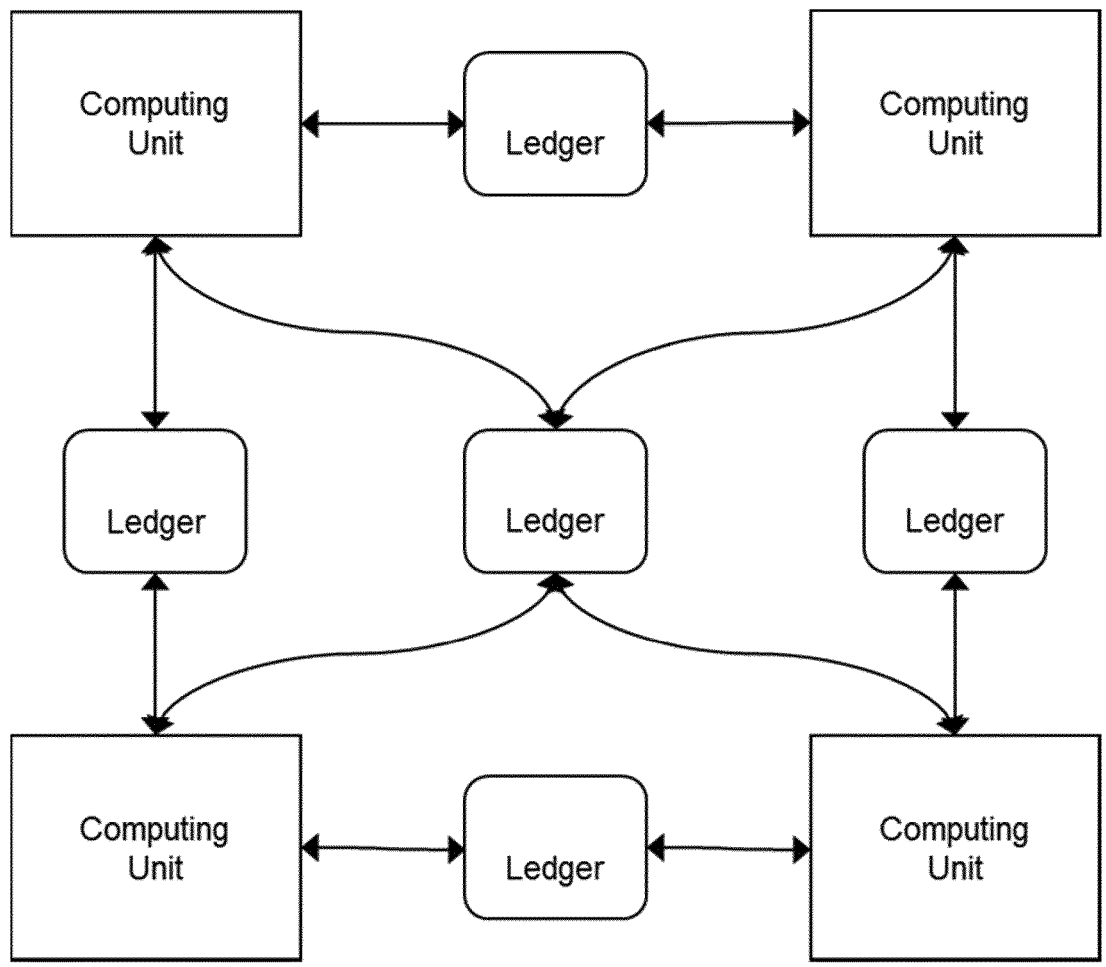
FIG. 4 is a schematic depiction of a consensus network.

Distributed ledgers, or shared ledgers, are well-known (see, for example, https://en.wikipedia.org/wiki/Distributed_ledger, the entire disclosure of which is incorporated herein by reference). Distributed ledgers can take many forms. A distributed ledger provides an historical ledger (or database or store or recording or log) of transactions (or events or records) that have taken place. This ledger is distributed across a network of computing units (or agents) as a tamper-evident log—each such unit may store its own local copy of the ledger (or at least part of the ledger). The ledger is cryptographically protected from modification— this can be achieved, for example by: (a) implementing the ledger using so-called "blockchains" (see, for example, https://en.wikipedia.org/wiki/Blockchain_(database), the entire disclosure of which is incorporated herein by reference); or (b) implementing the ledger using Merkle data structures (trees, DAGs, forests—see https://en.wikipedia.org/wiki/Merkle_tree, the entire disclosure of which is incorporated herein by reference)—such structures have built-in mechanisms to make the logs read-only; or (c) using other cryptographic techniques (e.g. cryptographic hashes, signatures, etc.). Prior to updating the ledger with a transaction (i.e. prior to writing an entry/record in the ledger to record the transaction), the transaction is agreed upon by multiple ones of the computing units using a multi-party consensus agreement/algorithm. Examples of such multi-party consensus agreements are Raft (see, for example, https://en.wikipedia.org/wiki/Raft_(computer_science), the entire disclosure of which is incorporated herein by reference) and Paxos (see, for example, https://en.wikipedia.org/wiki/Paxos_(computer_science), the entire disclosure of which is incorporated herein by reference). Consensus algorithms, like Raft and Paxos, provide methods for providing a proven and safe manner for a cluster of machines (or computing units) to arrive at agreed upon results—data can be distributed in a fault-tolerant and reliable way and the possibility of failures and degradation of the communication is taken into account while arriving at a consistent result. The computing units involved in maintaining the ledger effectively form a so-called "consensus network", whereby the computing units can arrive at agreed-upon data even in the presence of faults (e.g. loss of communication with one or more computing units, erroneous data provided by one or more computing units, etc.)—the notion of consensus is well-known in this field of technology (see, for example, https://en.wikipedia.org/wiki/Consensus_(computer_science), the entire disclosure of which is incorporated herein by reference). FIG. 4 is a schematic depiction of such a consensus network. Since the transactions are agreed upon by multi-party consensus prior to being stored in the ledger, and since the ledger is cryptographically protected from modification, the computing units participating in the maintenance of the ledger can have a very high degree of confidence that the data being stored in the ledger is authentic and accurate—it is difficult for a malicious computing unit to store an incorrect transaction in the ledger (due to the use of multi-party consensus to check/agree on a transaction prior to the transaction being stored in the ledger) and it is difficult for a malicious computing unit to modify an existing transaction in the ledger (to change it from being accurate to inaccurate) without being detected due to the cryptographic techniques (such as blockchains) that enable modifications to be detected. Essentially, for an attacker to be successful in a launching an attack, the attacker must be able to successfully compromise a large number of the computing units.

Thus, the components 204 of the system 200 act as the above-mentioned "computing units" to maintain a distributed ledger. As mentioned above, the distributed ledger comprises data records, wherein each data record stores information concerning one or more respective components 204 of the plurality of components 204 of the system 200. These data records correspond to the "transactions" mentioned above—thus, each data record will be written to, or stored as part of, the ledger once multiple components 204 of the system 200 have, via a multi-party consensus technique, agreed on the contents of that record. It may be that all of the components 204 of the system 200 need to be involved in the multi-party consensus technique when writing a record to the distributed ledger; alternatively, it may be that only a subset of the components 204 of the system 200 need to be involved in the multi-party consensus technique when writing a record to the distributed ledger. The process of "maintaining" the distributed ledger (i.e. the step 302 of FIG. 3), therefore involves the multiple components 204 updating the ledger with new data records (via consensus as discussed above).

Thus the distributed ledger may be viewed as a distributed data store arranged so that: (a) each of the data records of the distributed ledger is, respectively, replicated at multiple components 204 of the plurality of components 204 of the system 200; and (b) each of the data records of the distributed ledger is stored as part of the distributed ledger after, respectively, multiple components 204 of the plurality of components 204 of the system 200 have together reached consensus on that data record. Preferably, the distributed ledger is cryptographically protected so that authenticity and/or integrity of the data records of the distributed ledger can be verified—this could involve using blockchains or chaining the data records and storing, as part of a data record, a hash of a previous data record.

In some embodiments, a first layer in helping to secure the distributed ledger includes using digital signatures on events (such messages between components 204 or data of the data records of the distributed ledger), indicating the provenance and authenticity of these events. A component 204 may securely store (e.g. using one or more of the above-mentioned software protection techniques) a private key (or signature key) for use in generating and applying digital signatures. Verification of the events can be done by any subsystem or component 204 that holds the corresponding public key (or signature verification key), which may be freely distributed in the system 200. A next layer in helping to secure the distributed ledger may then include using hashes of the ledger elements (or data records or information within the data records) indicating the original, unaltered values of these elements. The software of the component(s) 204 of the system 200 that creates, appends, edits, and manipulates the distributed ledger may be protected with one or more of the above-mentioned software protection techniques, e.g. to prevent understanding (such as obfuscation, white-box cryptography, etc.), tampering (such as integrity verification, anti-debug, etc.), and other attacks like code lifting (such as node locking, watermarking, etc.).

The network 202 of FIG. 2a may be viewed as the above-mentioned consensus network, whereby multiple components 204 (or nodes) are continuously (or regularly or repeatedly) updating the distributed ledger to thereby maintain the distributed ledger. It may be that every component 204 of the network 202 is involved in maintaining the distributed ledger in this way; alternatively, the updating of the distributed ledger to thereby maintain the distributed ledger may be carried out by a subset of the components 204 of the system 200.

In some embodiments, all components 204 (or nodes) may be communicably connected to every other component 204 (or node). However, if the number of components 204 of the network 202 becomes large, some embodiments may have one or more components 204 acting as consensus nodes (for example based on the model adopted by Hyperledger—see, for example, https://en.wikipedia.org/wiki/Hyperledger, the entire disclosure of which is incorporated herein by reference)—this helps cut down on the amount of communication needed.

Figure 2B:
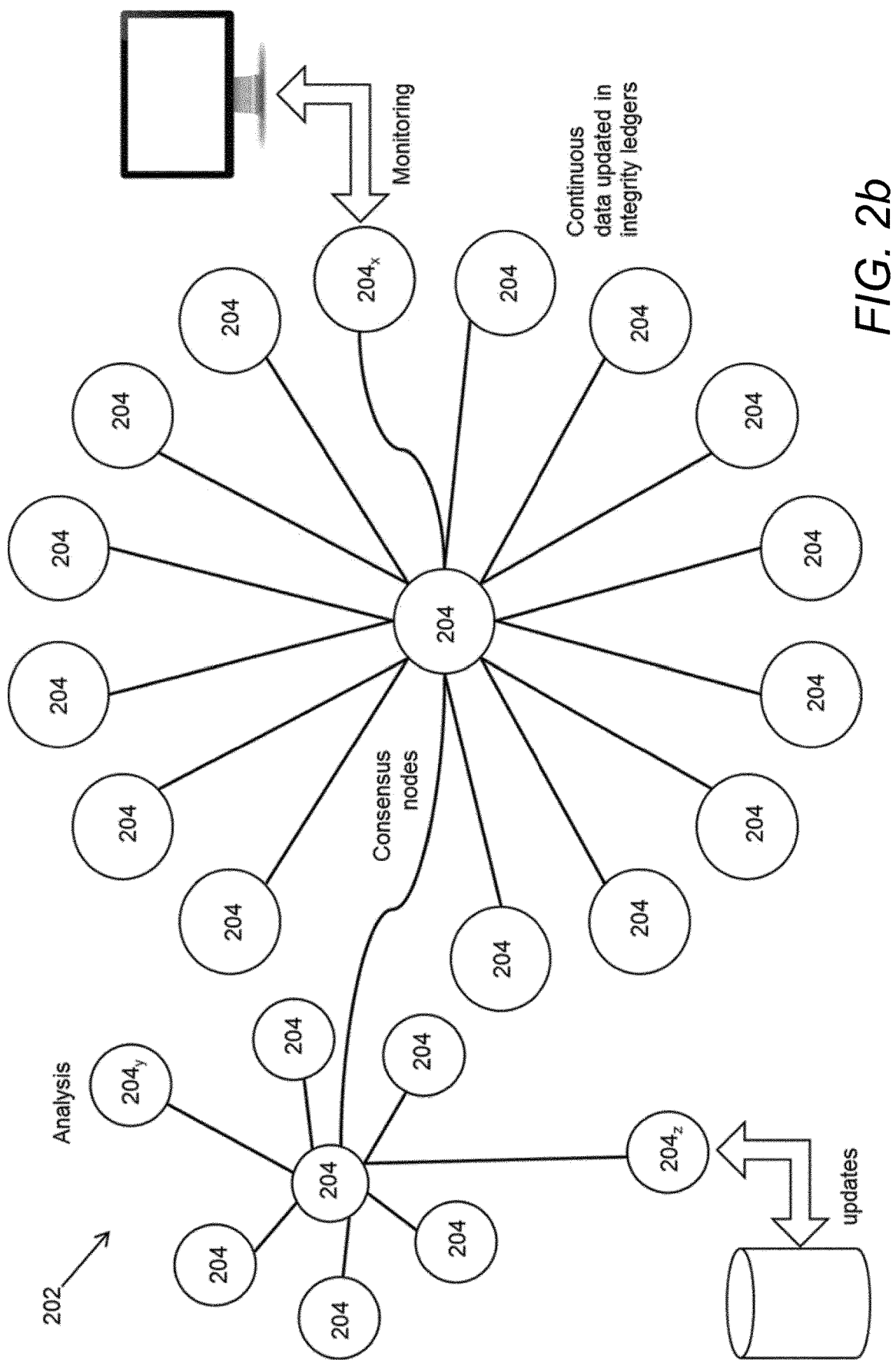
FIG. 2b schematically illustrates a network of components.

FIG. 2b schematically illustrates another network 202 of components 204. At the far right of the network 202 is a component 204, carrying out monitoring of the system 200—this can be achieved by tapping a single node 204 for the information which is available to every node 204 (i.e. due to the distributed nature of the distributed ledger). At the far left of the network 202 is a component $204_y$ performing analysis (e.g. the step 304 of FIG. 3). Additionally, at the far left of the network 202 is a component 204, pushing updates into the system 200. Such nodes $204_x$ and/or $204_y$ and/or $204_z$ can be placed at any single point in the system 200 (or in the network 202). Likewise, whilst FIG. 2b shows a single node $204_x$, a single node $204_y$ and a single node $204_z$, there may be different numbers of such nodes.

The distributed ledger may be viewed as an "integrity ledger", insofar as the distributed ledger may be used to check the current integrity or security of the system 200, and insofar as the information stored in one or more of the data records of the distributed ledger may comprise the results of integrity verification checks.

As mentioned above, each data record of the distributed ledger comprises (or stores or represents) information concerning one or more respective components 204 of the plurality of components 204. It will be appreciated, however, that the distributed ledger may store additional information other than such data records.

For each data record, the information stored in that data record concerning one or more respective components 204 may take many forms. For example, the information could comprise one or more of:

An identity of at least one of the components 204. Such identities (or identifiers) may be used, for example, at the step 304 when assessing whether the system 200 meets one or more respective security criteria. For example, one criterion of the security criteria could specify that a particular component 204 must have at least a particular version number, or must have carried out an integrity verification check (with no reported modifications) within a certain period of time, etc.—the identifiers of the components 204 can, therefore, be used to assist with checking such security criteria. Consequently, when a component 204 is included as part of the network 202 or is updated, it may be assigned a unique identifier (that is, at least, unique amongst the components 204 of the network 202)—this may be carried out by one or more of the components 204 of the network 202 and, indeed, the assignment of the identifier to a component 204 may, as an event, form part of the information recorded in one or more of the data records.

A version of at least one of the components 204, such as: a software release version number of a software component 204; a version number of firmware installed on a hardware component 204; a type or model or capability information (e.g. amount of memory) of a hardware component 204; etc.

A date of installation as part of the system 200 of a component 204.

A date of update of a components 204.

The results of one or more security tests carried out by a component 204 and/or data relating to the security of the system 200 (or data identifying security characteristics of, or security events of, the system 200) such as:

Detection of rooting or jailbreaking (or other means for unlocking an operating system so as to try to make unapproved modifications)—the information stored could comprise the results of tests that try to identify rooting/jailbreaking, or data that enables another component to carry out such tests, or information that indicates whether such rooting/jailbreaking has occurred.

Detection of branch jamming (such as replacing a conditional jump by an unconditional jump)—the information stored could comprise the results of tests that try to identify branch jamming, or data that enables another component to carry out such tests, or information that indicates whether such branch jamming has occurred.

Detection that software tracing or debugging is, or has been, conducted—the information stored could comprise the results of tests that try to identify tracing or debugging, or data that enables another component to carry out such tests, or information that indicates whether tracing or debugging has occurred.

Detection of compliance and/or violation of a Mandatory Access Control (MAC) policy (for example with SELinux, SMACK)—the information stored could comprise the results of tests that try to identify such policy violation, or data that enables another component to carry out such tests, or information that indicates whether such policy violation has occurred.

Integrity verification tests—as discussed above, one software protection technique involves IV. Consequently, one or more of the components 204 may be arranged to carry out IV tests to determine or check whether unauthorized modification of software elements of that component 204 and/or of one or more other components 204 has occurred. The information stored could comprise the results of such IV tests, or data that enables such tests to be carried out.

Such information could be stored along with corresponding date and/or time information. This may be useful, for example, so that one component 204 may ascertain how recently a security test was performed by another component 204.

Data relating to operational norms of one or more components 204, data relating to performance (or operational characteristics) of one or more components 204, or "health-check" data. Such information could be used to detect various attacks on the system, such as DDOS attacks. In particular, deviation from expected normal operational parameters can be detected, which may then be indicative of an attack. Examples of such data include (a) expected values for one or more of the following and/or (b) statistics generated over time for one or more of the following:
CPU load
Memory levels or usage
Disk levels or usage
Amounts of data transmitted/received (e.g. over a network)
Mounts
Interrupts
Socket usage/connections
TCP connections
systemd, ksmd, supervisord
Data to enable flagging of abnormalities for reliable computing As mentioned above, for one or more data records of the distributed ledger, the respective information comprises data indicating, for at least one of the respective components, a result of a corresponding integrity check of that component. In some embodiments, for each of said at least one of the respective components, that component performs the corresponding integrity check (i.e. has done the integrity verification on itself). In some embodiments, for each of said at least one of the respective components, that component repeatedly performs the corresponding integrity check, and the data records of the distributed ledger comprise, for each of the integrity checks performed by said component, a corresponding data record that comprises data indicating a result of that integrity check. Thus, an ongoing historical record of the integrity checking of one or more of the components may be maintained in the distributed ledger.

In some embodiments, the distributed ledger is used to maintain or create a dynamic record of monitored coherence of the components 204 of the system 200 and/or a dynamic record of compromises or anomalies manifested/detected at runtime—the above-mentioned examples of information stored in the data records can be used to this end. The data records of the distributed ledger may, therefore, store corresponding data relating the one or more of the components 204, such as data indicating whether or not there is coherence between two or more of the components 204 of the system 200 and/or data indicating whether compromises (e.g. attacks, failed integrity verification, etc.) or other anomalies have manifested or been detected at runtime.

Figure 8:
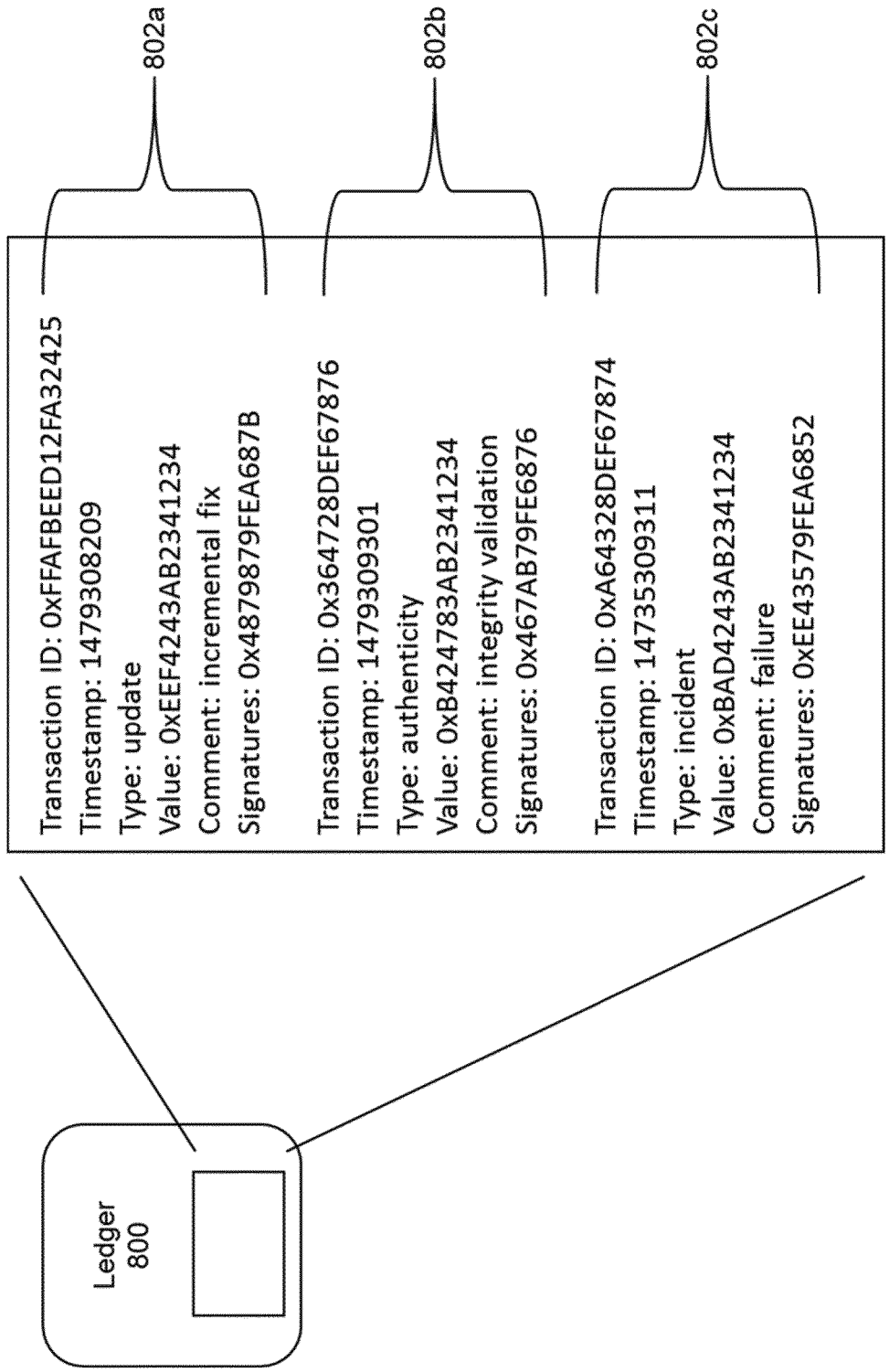
FIG. 8 schematically illustrates an example distributed ledger according to one embodiment of the invention.

FIG. 8 schematically illustrates an example distributed ledger 800 according to one embodiment of the invention. In this example, three data records 802a, 802b and 802c as shown. In particular:
The data record 802a relates to an update of a component 204, with corresponding data relating to that update.
The data record 802b relates to the performance of an integrity verification check, with corresponding data relating to that check.
The data record 802c relates to the occurrence of an incident (e.g. some detected attack or abnormal behavior), with corresponding data relating to that incident.

In some embodiments, the data for a data record may be represented by one or more Boolean values. In alternative embodiments, the data may be stored as a table of hash-like data values which need to be verified by one or more appropriate components 204 in the network 202. Furthermore, the interpretation of the values in the distributed ledger may, in some embodiments, only be known by individual components 204 or combinations of components 204 in the system 200 that needs to establish trust. This means that an attacker cannot compromise the system 200 at any single component 204 in the network 202 and must attack multiple components 204.

Figure 5:
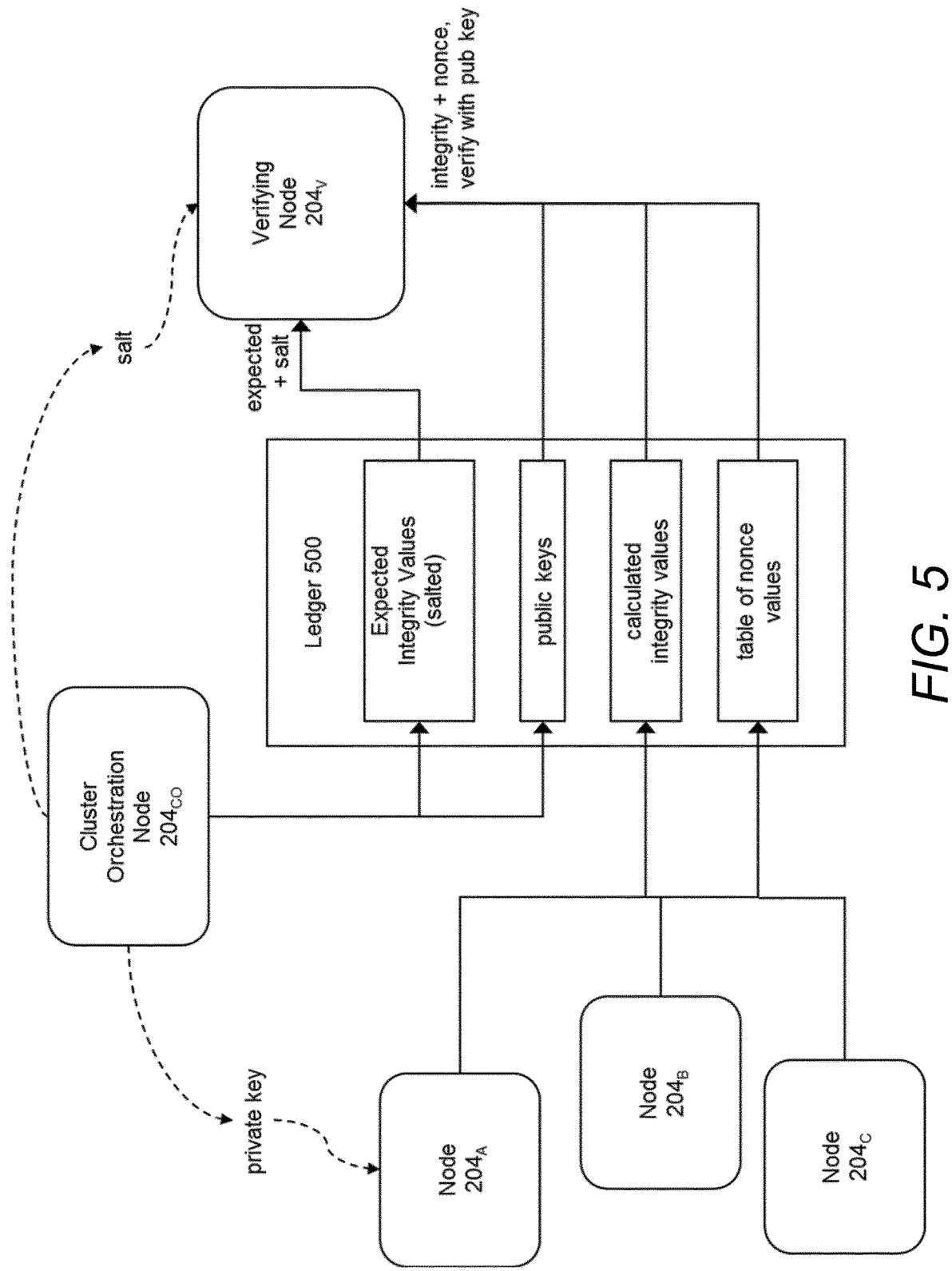
FIG. 5 schematically illustrates an example configuration of a system where integrity information is distributed among the nodes of the network of the system.
Figure 6A:
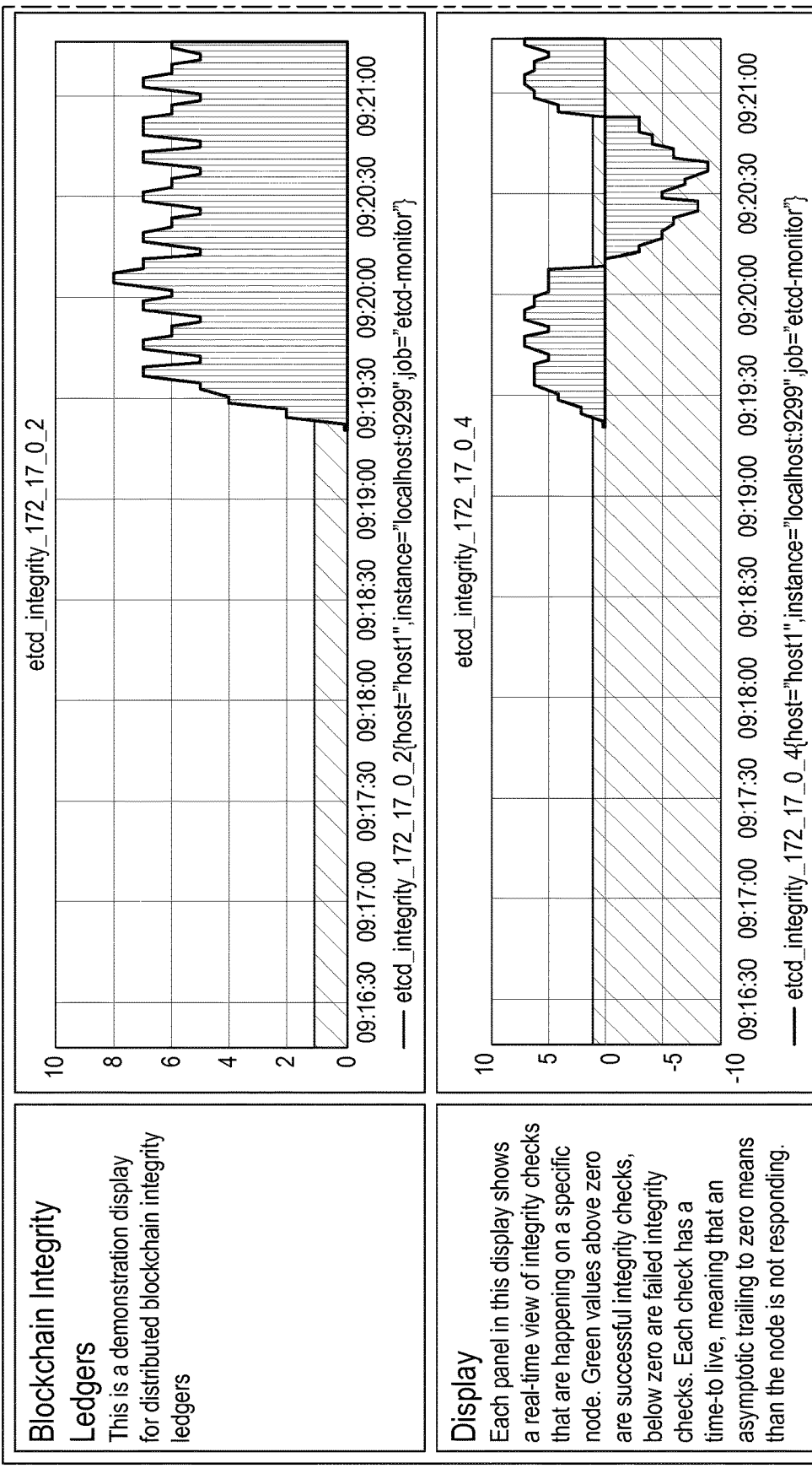
FIG. 6 illustrates an example graphical interface showing results of monitoring by the system.
Figure 6B:
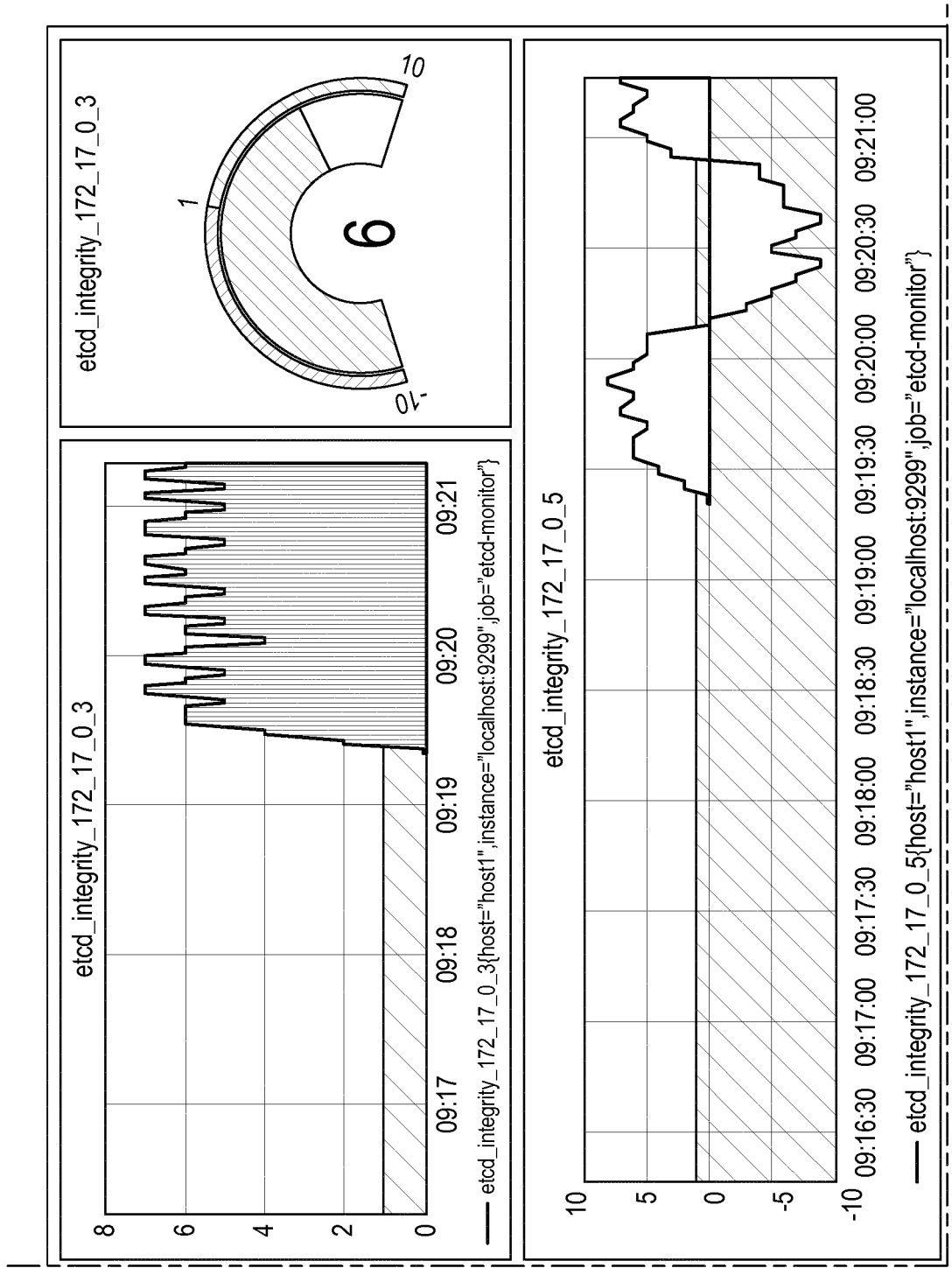
Figure 6C:
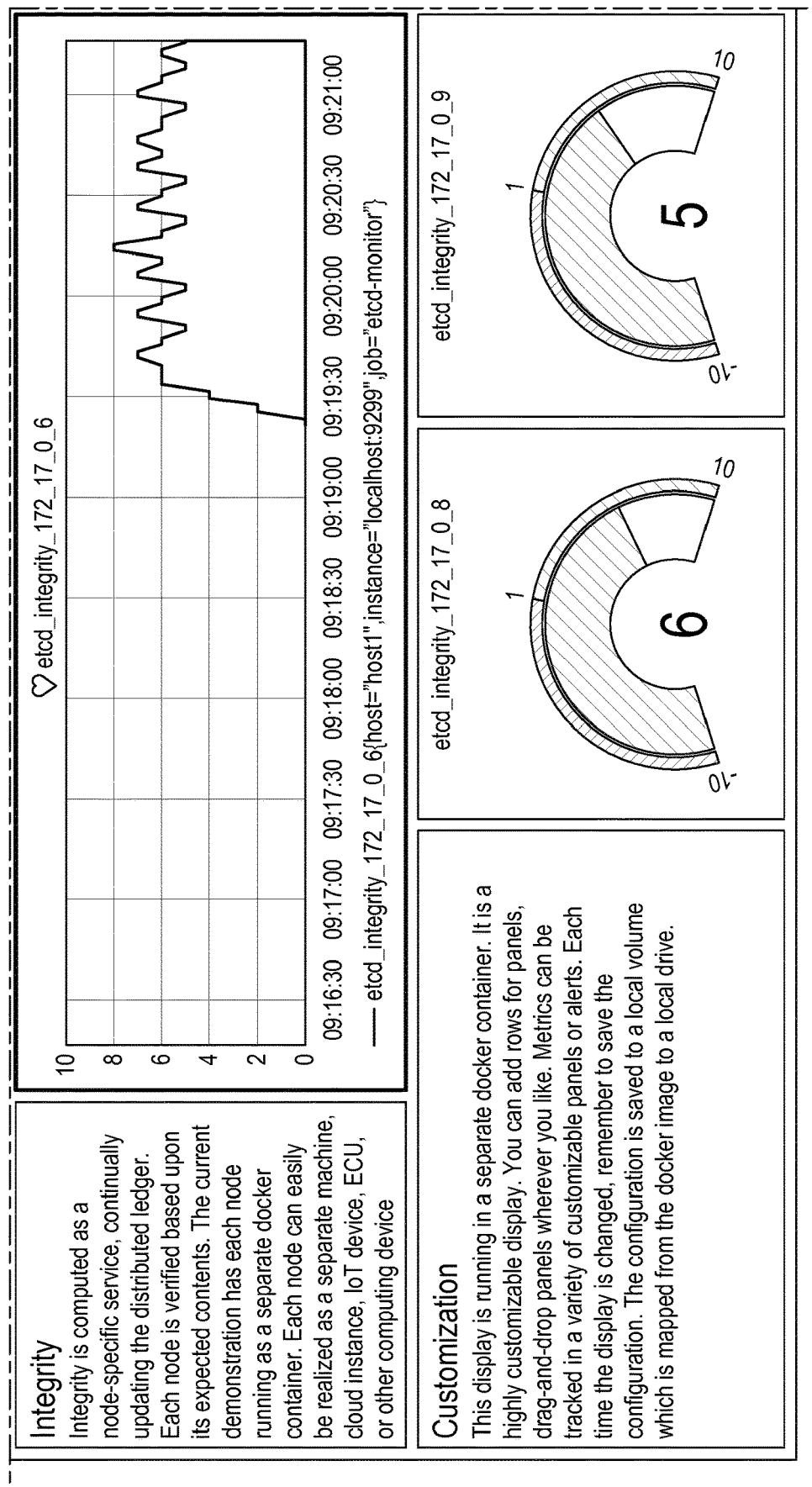
Figure 6D:
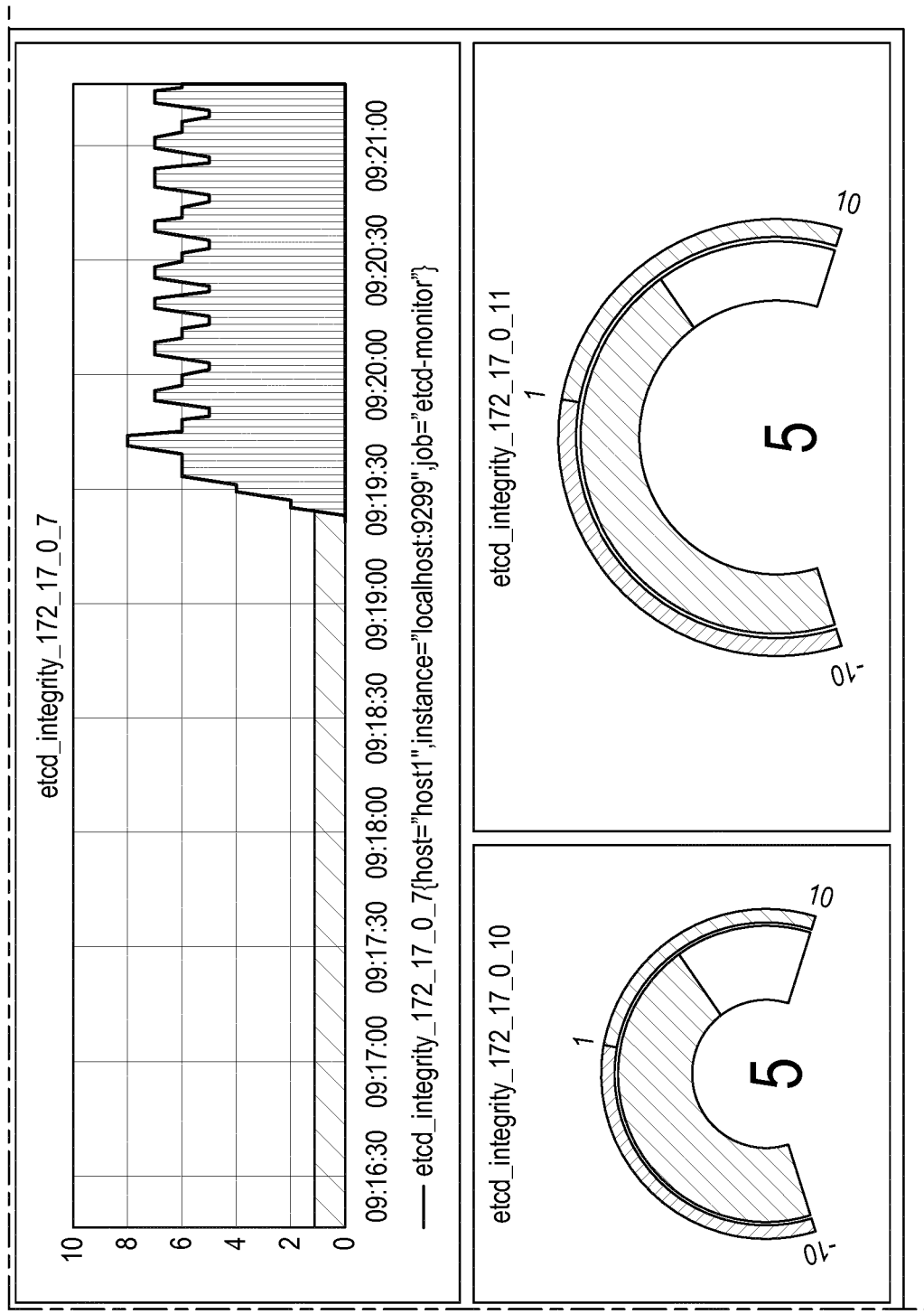

FIG. 5 schematically illustrates an example configuration of the system 200 where the integrity information is distributed among the nodes 204 of the network 202. A node $204_{OC}$ orchestrating the cluster of nodes 204, writes expected integrity values for nodes to be verified (e.g. nodes $204_A$, $204_B$, $204_C$) into the distributed ledger 500. These values may be altered with a salt. The salt is made available to any verifying nodes $204_V$ (e.g. a node carrying out the step 304) on a need-to-know basis. Additionally, the public keys for the nodes $204_A$, $204_B$, $204_C$ to be verified are made available to the verifying node $204_V$. The integrity values and public keys can either be made available in the distributed ledger 500 or hidden statically in the verifying node $204_V$—the use of statically hiding this data in the verifying node $204_V$ enables use of tamper detection/prevent software protection techniques in the verifying node $204_V$, whereas use of the distributed ledger 500 to store and provide this information offers the ability for updating/renewing values for redeployments.

As discussed above, one or more of the components 204 may be arranged to carry out IV tests to determine or check whether unauthorized modification of software elements of that component 204 and/or of one or more other components 204 has occurred. Integrity values (e.g. checksums or hashes) calculated by performing these tests may be placed in the distributed ledger 500 at runtime. Such integrity values may be generated/altered using a randomly generated nonce which is made available in a table in the distributed ledger 500—this helps prevent the integrity values from being repeated and therefore reduces an attacker's ability to attack the distributed ledger 500 in isolation. Verification at the verification node $204_V$ takes place through a combination of the calculated integrity values and nonces, in comparison to the salted expected integrity values, together with a public key verification of the messages involved. As the integrity values are now distributed through the network 202, an attacker is forced to attack more than one spot in the network 202. A record may be written to the distributed ledger 500 to store the results of the verification checks made by the verification node $204_V$.

In some embodiments, the distributed ledger is an unpermissioned, public shared ledger, i.e. any component 204 may provide an identity to the system 200 and become part of the network 202 independently from the other components 204 in the network 202, and that any component 204 can contribute data to the ledger. This has an advantage that management and organization of the network 202 is kept relatively low.

In alternative embodiments, the distributed ledger is a private, permissioned ledger. In particular, the identity of components 204 is managed centrally, e.g. by one of the components 204 (such as the orchestration component 204$_{co}$ of FIG. 5)—each component 204 of the system receives a unique identification. For example, hardware components 204 (e.g. processors such as CPUs, ECUs, VM, etc.) and software components 204 receive a unique identification as they are first deployed. The identification may have a correlation or be derived from a unique machine fingerprint, but this is not a hard requirement. The requirement is uniqueness within the full system 200 or network 202. Uniqueness may be accomplished through static means or through a challenge-response mechanism, as is known. Examples of this can be found in WO/2013/142981, WO/2013/142979, WO/2013/142980 and WO/2013/142983, the entire contents of which are incorporated herein by reference. As components 204 are deployed they each receive a unique identification. Additionally, as updates are applied to software components 204, or as hardware components 204 are replaced, those updates/replacements also receive a unique identification. These identifiers ensure that trust is only established to known entities. Trust may be broken or fall below a predetermined threshold with an entity. This is recorded in the integrity ledger. In this case, an entity can be made to rise back into a trusted state only through an appropriate reaction. Together with a unique identification, a public-private key pair (e.g. EC-DSA, RSA) may be generated and associated with the component 204 (for example, as shown in FIG. 5)—this allows each piece of information to be signed as it is added to the distributed ledger, as discussed above.

As mentioned above, in addition to integrity of components 204 of the system 200, other health metrics may be maintained in the distributed ledger. This may include classic monitoring of the system which has traditionally been used to flag abnormalities for reliable computing. While these types of data are not generally a definitive security indicator, they can give an additional measure which can be factored into the calculation of trust. This, in turn, leads to better and more informed command reactions (at steps 306 and 308) in the overall system 200. Deviation from expected values can be indicative of abnormal behaviour and maybe that an attack is being launched—e.g. a component 204 may be arranged to calculate a probability or likelihood of there being an attack being launch, and it might determine this as a higher probability when such deviation takes place. Expected values can be generated over time as statistics, or as an historical record. For example, an historical record of CPU usage can be generated over time by a component 204, so that if current CPU usage (or other resource usage) is substantially higher or lower than the statistics indicate should be occurring, then this can be indicative of abnormal behaviour and maybe that an attack is being launched—e.g. a component 204 may be arranged to calculate a probability or likelihood of there being an attack being launch, and it might determine this as a higher probability when the current CPU usage (or other resource usage) is substantially higher or lower than the statistics indicate should be occurring).

For example, if an infrequently occurring integrity breach is detected, health statistics can be useful in determining whether information is likely accurate.

Returning to FIG. 3, the step 304 may be part of the at least one component 204 (that carries out the step 304) determining whether or not to perform an operation as part of said operating the system. For example the at least one component 204 may be arranged to only carry out the operation if the security of the system 200 is considered to be sufficiently secure (which is why the at least one component 204 is arranged to process the information stored in one or more respective data records of the distributed ledger to determine whether the system 200 meets one or more respective security criteria). In other words, the at least one component 204 may be arranged to only perform the operation if the at least one component 204 has sufficient trust in the system 200. Thus, the first action (carried out at the step 306) may comprise enabling performance of the operation—i.e. the operation can be carried out if the system meets the one or more respective security criteria; likewise, the second action may comprise preventing performance of the operation—i.e. the operation is not carried out if the system does not meet the one or more respective security criteria.

In some embodiments, the step 304 is performed repeatedly according to respective security check timing conditions. For example, the at least one component 204 that carries out the step 304 may be arranged to perform the step 304 at regular time intervals (e.g. once every t seconds), as a regular check on the security or safety of the system 200. In this way, attacks on the system 200 and/or failures of components 204 of the system 200 can be quickly detected and appropriate measures (such as entering a fail-safe mode or raising an alarm) can be taken at the step 308.

Additionally, or alternatively, the step 304 is performed in an "on-demand" basis—one example of this is, as discussed above, when a component wishes to determine whether or not to perform an operation as part of said operating the system.

At the step 308, the second action can take a variety of forms, such as one or more of:
- Causing a warning message to be generated—the warning message could be generated and output (e.g. on a display of a user-interface) by the same component 204 that carried out the step 304; alternatively, the component 204 that carried out the step 304 could instruct another component 204 of the system 200 to generate the warning message.
- Causing an alarm to be raised—the alarm could be raised (e.g. an audible or visual signal) by the same component 204 that carried out the step 304; alternatively, the component 204 that carried out the step 304 could instruct another component 204 of the system 200 to raise the alarm.
- Preventing the system 200 from carrying out one or more operations that would otherwise be part of the (normal) operation of the system 200. For example, if the system 200 is no longer considered to be secure (because the system 200 no longer meets the one or more security criteria), then access to sensitive information (which may normally be granted) may be prohibited, or operation that could cause harm to humans (e.g. travelling above a certain speed) may be prohibited.
- The system 200 may be placed into a fail-safe mode of operation, back-up mode of operation or redundant fail-over mode of operation.
- The system 200 requesting, or obtaining, an update for one or more components 204. For example, if the system 200 is determined as not meeting the one or more security criteria because one of the components 204 of the system 200 are out of date (e.g. a version number is too low), then an updated version of that component 204 may be requested.

Generating a data record in the distributed ledger that can be consumed or used by one or more components 204 of the network 202 (e.g. in the cloud) for machine learning purposes (as set out later).

At the step 306, the first action can take a variety of forms, such as one or more of:

Allowing, or enabling, the system 200 to carry out one or more operations as part of the (normal) operation the system 200. For example, if the system 200 is considered to be secure (because the system 200 meets the one or more security criteria), then access to sensitive information (which may normally be granted) may be allowed or operation that could cause harm to humans if the system were not secure (e.g. travelling above a certain speed) may be allowed.

Causing a status message to be generated (e.g. to indicate that the system 200 appears to be secure)—the status message could be generated and output (e.g. on a display of a user-interface) by the same component 204 that carried out the step 304; alternatively, the component 204 that carried out the step 304 could instruct another component 204 of the system 200 to generate the status message.

Naturally, the security criteria used may depend on the information available or stored in the distributed ledger, together with what conditions the developer of the component 204 carrying out the step 304 wishes to impose. The options for the security criteria are countless, but examples include one or more of the following:

(a) a criterion that a particular component 204 of the plurality of components 204 is a predetermined version of that component 204;

(b) a criterion that a particular component 204 of the plurality of components 204 is at least a predetermined minimum version of that component 204;

(c) a criterion that, for one or more components 204 of the plurality of components 204, a corresponding integrity check of that component 204 indicates that that component has not been compromised;

(d) a criterion that, for one or more software components 204 of the plurality of components 204, a corresponding anti-debugging check of that component 204 indicates that that component 204 either is not or has not been executed within a debugger;

(e) a criterion that, for one or more components 204 of the plurality of components 204, a corresponding anti-hooking check of that component 204 indicates that that component 204 either is not or has not experienced hooking;

(f) a criterion that, for one or more components 204 of the plurality of components 204, corresponding resource (e.g. processor, network, memory) usage is less than a predetermined threshold;

(g) a criterion that, for one or more components 204 of the plurality of components 204, a security check in relation to that component 204 has been successfully conducted sufficiently recently (e.g. within a particular period of time from the current time);

(h) a criterion that the current performance characteristics of one or more components 204 of the plurality of components 204 correspond to expected performance characteristics of those one or more components 204.

One or more security criteria may be hard-coded as code of a component 204 (e.g. specific instructions to cause specific comparisons of data from the distributed ledger against predetermined values or specific operations on such data). Additionally, or alternatively, the one or more security criteria may be represented as a configuration file for processing by a component 204 (e.g. an XML file of tests to carry out and conditions for those tests). The security criteria may be protected from modification and/or inspection and/or avoidance by an attacker by using any of the above-mentioned software protection techniques to implement the security criteria.

There are a number of additional ways in which the information stored in the distributed ledger can be used, for example in the back-end of a fault-tolerant system 200. This may include (real-time) monitoring, logging, (machine learning) analysis.

Classic monitoring approaches involve a single back-end server which collects data from all sources, often over TCP/IP. These can use transport security mechanisms like TLS/HTTPS to ensure confidentiality of the data. While this is a valid approach, it does have a single point of failure: the aggregation point. From a security perspective, this is not desirable. With distributed ledger approach of the system 200, as set out above, all nodes 204 know about all the information in the whole system 200 (by virtue of the distributed ledger). As there is agreement on provenance of the data, an attacker trying to make modifications needs to hack many points of the system 200 in order to achieve his goal. Redundancy is, therefore, a built-in feature of the system 200.

The monitoring can be carried out based on accessing data via any of the nodes 204 of the system 200. In particular (real-time) monitoring of the system 200 is a simple matter of tapping one of the nodes 204 of the system 200, since all nodes have the relevant information. In fact, any node of the system can provide such monitoring. For example, with reference to vehicles, reading of the information from the distributed ledger can be provided in-vehicle (e.g. to IVI, to a paired diagnostic device) or externally (e.g. to a cloud service, to on an premise network).

FIG. 6 illustrates an example graphical interface showing results of such monitoring. Each graph or gauge shows the results of real-time integrity checks of the system. Positive values are the number of successful checks, while negative values are failed checks. The user has the flexibility to view values as a graph or gauge (or both). Additionally, alerts can be associated with the time-based values. In the display, nodes 4 and 5 (2nd row) show an attack where a file on the system is was modified. The display shows the failure of these integrity checks as negative values. After the files have been restored (e.g. manually or by some automatic update at the step 308), the system 200 is shown to recover. It will be appreciated that FIG. 6 is merely one example of how to display, to a user, data relating to the security of the system 200 based on the information stored in the distributed ledger.

Figure 7:
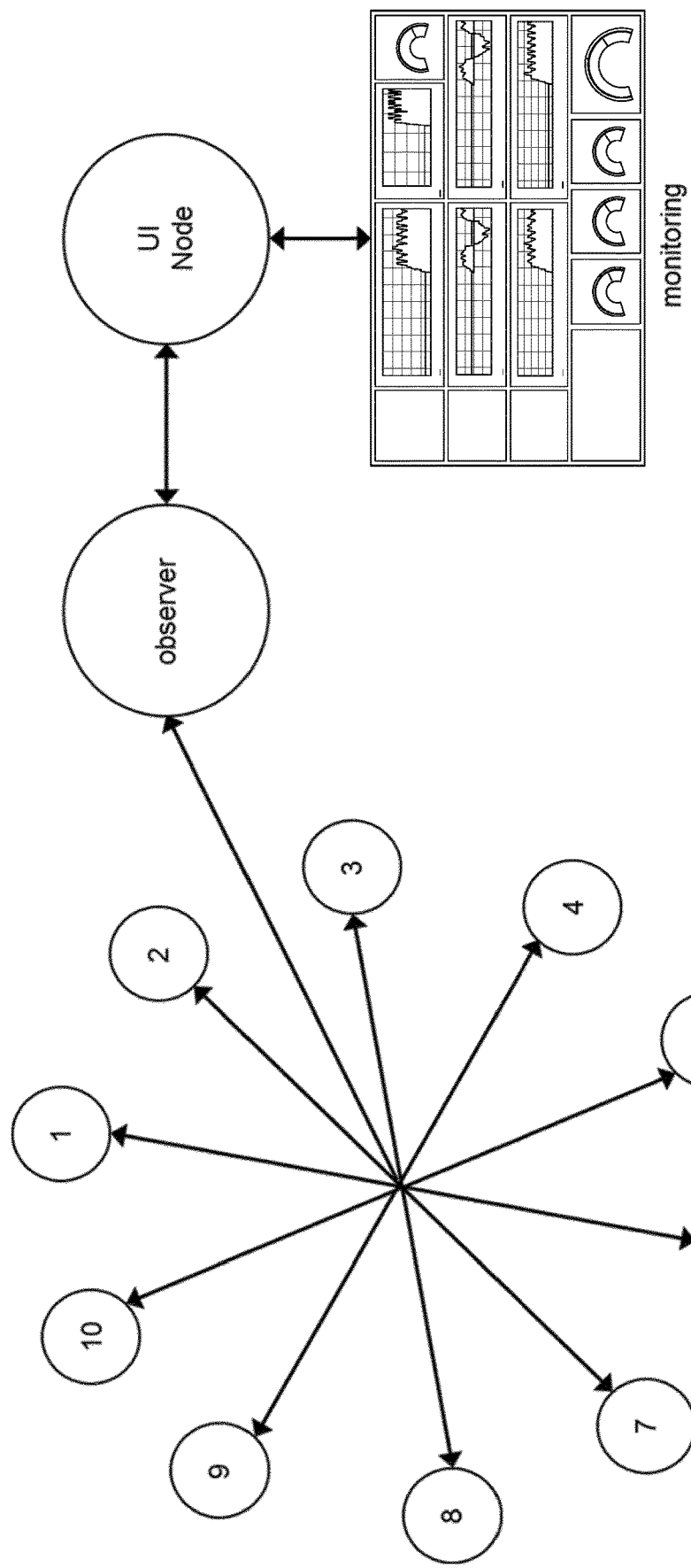
FIG. 7 schematically illustrates a system comprising nodes.

FIG. 7 schematically illustrates a system 200 comprising 12 nodes 204. The network 202 depicted in FIG. 7 comprises a group of 10 nodes 204. In one example, these nodes may be running in docker containers, each connected to a distributed consensus network, using etcd. Each of these nodes 204 comprises a self-verifying software component, which does integrity verification of the node-specific system. The verification successes or failures are written to the shared ledger with a predetermined time-to-live. The distributed ledger allows every node 204 in the network 202 to know the health of each other node 204 in real-time. Two further nodes 204 to the right of FIG. 7 allow operation monitoring of the system 200. An observer node 204 is part of the distributed network 202, seeing real-time changes to the distributed ledger. Note that this observer node 204 could be any of the nodes 204 in the network, being exposed to the same level of information. Connected to the observer node 204 at the right is a UI (user interface) node 204 for providing an output based on information ascertained by the observer node 204 (such as the example interface shown in FIG. 6). The UI node 204 may, for example, host a graphics package (e.g. to display information based on the distributed ledger over http).

Thus, in some embodiments, the method 300 also comprises displaying, to a user, data based at least in part on said determination of whether the system meets one or more respective security criteria.

Going beyond human monitoring or display of data to a user, the data from the distributed ledger can be used to update the system 200. In some embodiments, at least one component 204 updates the one or more security criteria based on an analysis of the distributed ledger. Such updating could comprise one or more of: (a) deleting at least one of the one or more respective security criteria; (b) adding at least one additional security criterion to the one or more respective security criteria; (c) modifying at least one of the one or more respective security criteria; (d) changing the one or more respective security criteria to improve the operational security of the system.

For example, a machine learning algorithm may identify and react to states of the system 200. For example, if a certain version of software tends to fail a high percentage of the time on a certain processor type, this information will be identifiable from the distributed ledger, so that the security criteria can adapt to this "normal" behaviour. Similarly, if a certain piece of software is prone to attacks of a certain piece of malware, this will be identifiable from the distributed ledger, so that the security criteria can implement appropriate countermeasures. Furthermore, as the distributed ledger grows over time based on more data samples, reactions (i.e. the first or second actions at the steps 306 and 308) can be built into the system. These reactions can include safety measures, such as a command to force a sub-system into a fail-safe mode, or to cause sub-system to rollover to a back-up sub-system while the main system receives an over-the-air update. Furthermore, as time moves on and data is collected in a population of protected systems, a learning system can determine which health statistics are reliable and what information is associated with real compromises as opposed to false alarms. Recording of incidents and the associated triggers in the systems are an invaluable resource to establish reputation and give confidence to ward off attacks of the future.

To limit the growth of a distributed ledger, some embodiments of the invention may implement a pruning mechanism to keep the distributed ledger to a manageable size. However, simply removing a number of blocks from the ledger may not be the best approach, as this could destroy tamper-evident hashes and may remove vital information including authenticity and incident transactions. Re-signing of data records and/or information of the data records following removal of some data records from the distributed ledger can be used to keep the size of the distributed ledger more manageable. Moreover, as the distributed ledger generally contains node-specific information, the distributed ledger may be implemented so that information or data records are maintained or stored within a region/location where that information or data records may be used—in particular, it may not be necessary that every node 204 be able to query the information from every other node 204. For example, for connected vehicles, information regarding an ECU may be maintained within the region of the vehicle itself.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of operating at least part of a system, wherein the system comprises a plurality of components, wherein the system maintains a distributed ledger, wherein the distributed ledger comprises data records, wherein each data record stores information concerning one or more respective components of the plurality of components, wherein the distributed ledger is a distributed data store arranged so that: (a) each of the data records of the distributed ledger is, respectively, replicated at multiple components of the plurality of components of the system; and (b) each of the data records of the distributed ledger is stored as part of the distributed ledger after, respectively, multiple components of the plurality of components of the system have together reached consensus on that data record; the method comprising:

at least one component of the plurality of components processing the information stored in one or more respective data records of the distributed ledger to determine whether the system meets one or more respective security criteria; and one or both of:
(i) the at least one component performing a respective first action if the at least one component determines that the system meets the one or more respective security criteria; and
(ii) the at least one component performing a respective second action if the at least one component determines that the system does not meet the one or more respective security criteria;

wherein the one or more security criteria comprise one or more of the following:
(a) a criterion that a particular component of the plurality of components is a predetermined version of that component;
(b) a criterion that a particular component of the plurality of components is at least a predetermined minimum version of that component;
(c) a criterion that, for one or more components of the plurality of components, a corresponding integrity check of that component indicates that that component has not been compromised;
(d) a criterion that, for one or more software components of the plurality of components, a corresponding anti-debugging check of that component indicates that that component either is not or has not been executed within a debugger;
(e) a criterion that, for one or more components of the plurality of components, a corresponding anti-hooking check of that component indicates that that component either is not or has not experienced hooking;
(f) a criterion that, for one or more components of the plurality of components, corresponding resource usage is less than a predetermined threshold;
(g) a criterion that, for one or more components of the plurality of components, a security check in relation to that component has been successfully conducted sufficiently recently;
(h) a criterion that the current performance characteristics of one or more components of the plurality of components correspond to expected performance characteristics of those one or more components.

2. The method of claim 1, comprising the at least one component determining whether or not to perform an operation as part of said operating the system, wherein:
said determining whether or not to perform the operation comprises said processing the information stored in one or more respective data records of the distributed ledger to determine whether the system meets one or more respective security criteria;
said first action comprises enabling performance of the operation;
said second action comprises preventing performance of the operation.

3. The method of claim 1 comprising the at least one component repeatedly performing said processing the information stored in one or more respective data records of the distributed ledger to determine whether the system meets one or more respective security criteria according to respective security check timing conditions.

4. The method of claim 1, wherein, for one or more data records of the distributed ledger, the information stored by said one or more data records comprises data indicating, for at least one of the respective components, a result of a corresponding integrity check of that component.

5. The method of claim 4, comprising, for each of said at least one of the respective components, said component performing said corresponding integrity check.

6. The method of claim 5, comprising, for each of said at least one of the respective components, said component repeatedly performing said corresponding integrity check, wherein the data records of the distributed ledger comprise, for each of the integrity checks performed by said component, a corresponding data record that comprises data indicating a result of that integrity check.

7. The method of claim 1, comprising at least one component of the plurality of components updating the one or more respective security criteria based on an analysis of the distributed ledger.

8. The method of claim 7, wherein said updating comprises one or more of:
(a) deleting at least one of the one or more respective security criteria;
(b) adding at least one additional security criterion to the one or more respective security criteria;
(c) modifying at least one of the one or more respective security criteria;
(d) changing the one or more respective security criteria to improve the operational security of the system.

9. The method of claim 1, wherein said second action comprises one or both of: (a) causing a warning message to be generated and (b) preventing the system from carrying out one or more operations that would otherwise be part of said operating the system.

10. The method of claim 1, wherein said first action comprises allowing the system to carry out one or more operations as part of said operating the system.

11. The method of claim 1, wherein, for one or more data records of the distributed ledger, the information stored by said one or more data records comprises data indicating one or more of:
(a) an identity of at least one of said one or more respective components;
(b) a version of at least one of said one or more respective components;
(c) a date of installation as part of the system of at least one of said one or more respective components;
(d) a date of update of at least one of said one or more respective components;
(e) a result of a security test carried out by at least one of said one or more respective components;
(f) data relating to the security of the system;
(g) data identifying security characteristics of, or identifying security events of, the system;

(h) data relating to an operational norm of one or more components of the plurality of components;

(i) data relating to performance or operational characteristics of one or more components of the plurality of components.

12. The method of claim 1, comprising displaying, to a user, data based at least in part on said determination of whether the system meets one or more respective security criteria.

13. The method of claim 1, wherein one or more of the components of the system are (a) respective items of software executable by the system or (b) respective hardware elements.

14. The method of claim 1, wherein the distributed ledger is cryptographically protected so that authenticity and/or integrity of the data records of the distributed ledger can be verified.

15. The method of claim 14, wherein said cryptographic protection of the distributed ledger involves using one or more of:
    blockchains;
    chaining the data records and storing, as part of a data record, a hash of a previous data record;
    encrypting at least some of the information of the data records;
    digitally signing at least some of the information of the data records.

16. The method of claim 1, wherein the system is part of one or more vehicles.

17. The method of claim 1, wherein the system comprises one or more networks to enable communication of data between the plurality of components to thereby carry out said maintaining the distributed ledger.

18. A system comprising a plurality of components, wherein:
    the system is arranged to maintain a distributed ledger, wherein the distributed ledger comprises data records, wherein each data record stores information concerning one or more respective components of the plurality of components, wherein the distributed ledger is a distributed data store arranged so that: (a) each of the data records of the distributed ledger is, respectively, replicated at multiple components of the plurality of components of the system; and (b) each of the data records of the distributed ledger is stored as part of the distributed ledger after, respectively, multiple components of the plurality of components of the system have together reached consensus on that data record;
    at least one component of the plurality of components includes at least one computer processor and at least one memory device storing instructions which, when executed by the at least one computer processor, cause the at least one computer processor to process the information stored in one or more respective data records of the distributed ledger to determine whether the system meets one or more respective security criteria; and
    one or both of:
      (i) the at least one component is arranged to perform a respective first action if the at least one component determines that the system meets the one or more respective security criteria; and
      (ii) the at least one component is arranged to perform a respective second action if the at least one component determines that the system does not meet the one or more respective security criteria;

wherein the one or more security criteria comprise one or more of the following:
(a) a criterion that a particular component of the plurality of components is a predetermined version of that component;
(b) a criterion that a particular component of the plurality of components is at least a predetermined minimum version of that component;
(c) a criterion that, for one or more components of the plurality of components, a corresponding integrity check of that component indicates that that component has not been compromised;
(d) a criterion that, for one or more software components of the plurality of components, a corresponding anti-debugging check of that component indicates that that component either is not or has not been executed within a debugger;
(e) a criterion that, for one or more components of the plurality of components, a corresponding anti-hooking check of that component indicates that that component either is not or has not experienced hooking;
(f) a criterion that, for one or more components of the plurality of components, corresponding resource usage is less than a predetermined threshold;
(g) a criterion that, for one or more components of the plurality of components, a security check in relation to that component has been successfully conducted sufficiently recently;
(h) a criterion that the current performance characteristics of one or more components of the plurality of components correspond to expected performance characteristics of those one or more components.

19. A component of a system, the system comprising a plurality of components, wherein the system maintains a distributed ledger, wherein the distributed ledger comprises data records, wherein each data record stores information concerning one or more respective components of the plurality of components, wherein the distributed ledger is a distributed data store arranged so that: (a) each of the data records of the distributed ledger is, respectively, replicated at multiple components of the plurality of components of the system; and (b) each of the data records of the distributed ledger is stored as part of the distributed ledger after, respectively, multiple components of the plurality of components of the system have together reached consensus on that data record; wherein said component includes at least one computer processor and at least one memory device storing instructions which, when executed by the at least one computer processor, cause the at least one computer processor to:
    process the information stored in one or more respective data records of the distributed ledger to determine whether the system meets one or more respective security criteria; and
    one or both of:
      (i) perform a respective first action if said component determines that the system meets the one or more respective security criteria; and
      (ii) perform a respective second action if said component determines that the system does not meet the one or more respective security criteria;
wherein the one or more security criteria comprise one or more of the following:
(a) a criterion that a particular component of the plurality of components is a predetermined version of that component;

(b) a criterion that a particular component of the plurality of components is at least a predetermined minimum version of that component;
(c) a criterion that, for one or more components of the plurality of components, a corresponding integrity check of that component indicates that that component has not been compromised;
(d) a criterion that, for one or more software components of the plurality of components, a corresponding anti-debugging check of that component indicates that that component either is not or has not been executed within a debugger;
(e) a criterion that, for one or more components of the plurality of components, a corresponding anti-hooking check of that component indicates that that component either is not or has not experienced hooking;
(f) a criterion that, for one or more components of the plurality of components, corresponding resource usage is less than a predetermined threshold;
(g) a criterion that, for one or more components of the plurality of components, a security check in relation to that component has been successfully conducted sufficiently recently;
(h) a criterion that the current performance characteristics of one or more components of the plurality of components correspond to expected performance characteristics of those one or more components.

20. A vehicle comprising one or more components according to claim 19.

* * * * *